US011307895B2

(12) United States Patent
Novak et al.

(10) Patent No.: US 11,307,895 B2
(45) Date of Patent: Apr. 19, 2022

(54) AUTO-SCALING CLOUD-BASED MEMORY-INTENSIVE APPLICATIONS

(71) Applicant: UNIVERSITY OF UTAH RESEARCH FOUNDATION, Salt Lake City, UT (US)

(72) Inventors: Joe H. Novak, Sandy, UT (US); Sneha K. Kasera, Salt Lake City, UT (US); Ryan Stutsman, Salt Lake City, UT (US)

(73) Assignee: UNIVERSITY OF UTAH RESEARCH FOUNDATION, Salt Lake City, UT (US)

( * ) Notice: Subject to any disclaimer, the term of this patent is extended or adjusted under 35 U.S.C. 154(b) by 163 days.

(21) Appl. No.: 16/737,099

(22) Filed: Jan. 8, 2020

(65) Prior Publication Data

US 2020/0218574 A1 Jul. 9, 2020

Related U.S. Application Data

(60) Provisional application No. 62/790,329, filed on Jan. 9, 2019.

(51) Int. Cl.
*G06F 9/50* (2006.01)
*G06F 9/455* (2018.01)
*G06F 9/4401* (2018.01)
*G06F 9/54* (2006.01)

(52) U.S. Cl.
CPC .......... *G06F 9/5016* (2013.01); *G06F 9/4418* (2013.01); *G06F 9/45558* (2013.01); *G06F 9/505* (2013.01); *G06F 9/5088* (2013.01); *G06F 9/54* (2013.01); *G06F 2009/45562* (2013.01); *G06F 2009/45583* (2013.01); *G06F 2209/5011* (2013.01); *G06F 2209/5019* (2013.01); *G06F 2209/5022* (2013.01)

(58) Field of Classification Search
CPC ...... G06F 9/5016; G06F 9/505; G06F 9/5088; G06F 9/45558; G06F 9/4418; G06F 9/54; G06F 2009/45562; G06F 2209/5022; G06F 2209/5019; G06F 2209/5011; G06F 2009/45583; G06F 9/5077
See application file for complete search history.

(56) References Cited

U.S. PATENT DOCUMENTS

| 2012/0117299 | A1* | 5/2012 | Waldspurger | ....... G06F 11/3471 711/6 |
| 2019/0042457 | A1* | 2/2019 | Doshi | ................. G06F 12/0893 |

* cited by examiner

*Primary Examiner* — Sisley N Kim
(74) *Attorney, Agent, or Firm* — Workman Nydegger

(57) ABSTRACT

Improved techniques for dynamically responding to a fluctuating workload. Resources are reactively scaled for memory-intensive applications and automatically adapted to in response to workload changes without requiring pre-specified thresholds. A miss ratio curve (MRC) is generated for an application based on application runtime statistics. This MRC is then modeled as a hyperbola. An area on the hyperbola is identified as satisfying a flatten threshold. A resource allocation threshold is then established based on the identified area. This resource allocation threshold indicates how many resources are to be provisioned for the application. The resources are scaled using a resource scaling policy that is based on the resource allocation threshold.

16 Claims, 13 Drawing Sheets

(e) Throughput, Knee (f) Throughput, LR (g) Step Queuing Delay, Knee (h) Step Queuing Delay, LR

AUTO-SCALING CLOUD-BASED MEMORY-INTENSIVE APPLICATIONS

CROSS-REFERENCE TO RELATED APPLICATIONS

This application claims the benefit of and priority to U.S. Provisional Patent Application Ser. No. 62/790,329 filed on Jan. 9, 2019 and entitled "AUTO-SCALING CLOUD-BASED MEMORY-INTENSIVE APPLICATIONS," which application is expressly incorporated herein by reference in its entirety.

STATEMENT AS TO FEDERALLY-SPONSORED RESEARCH

This invention was made with Government support under grant no. 1302688 awarded by the National Science Foundation. The Government has certain rights in the invention.

BACKGROUND

Today, computer developers are commonly faced with building and deploying large-scale applications spanning the resources of many virtual machines on cloud infrastructures. Properly provisioning these virtual machines remains a significant challenge, however.

For example, application workloads are constantly changing, and even small changes to an application's logic can result in hard-to-predict changes in that application's resource requirements. On one hand, applications that are over-provisioned waste resources and increase costs while on the other hand, applications that are under-provisioned execute slowly and provide poor user experiences. It is desirable, therefore, to configure cloud resources for applications and tenants in a manner that both uses resources efficiently and that ensures optimal user experiences.

Currently, some cloud providers are able to scale their resources/infrastructures to help accommodate tenants. Although some techniques are available, these scaling techniques or policies are simplistic, and they typically force tenants to prematurely or preemptively set stringent and inflexible resource requirement thresholds. These thresholds often require prior knowledge of the tenants' applications and the applications' projected/anticipated workloads. Consequently, with these traditional techniques, tenants are first required to perform an early analysis or prediction of their applications and workloads. Using this first set of predictions, the tenants then make another prediction as to how to add or remove resources based on cloud resource runtime statistics provided by the cloud providers. It should be appreciated that these initial predictions are quite time consuming. Furthermore, these predictions are often performed continuously, or at the very least periodically, to adequately respond to application evolutions and to provide the desired user experience without wasting resources. As a consequence, performing these predictions impose serious burdens.

While estimating resource needs for some simplistic applications may be comparatively straightforward, it is significantly more difficult to estimate the resource needs for advanced and complicated applications. As one example, the resource needs of a parallelizable, partitionable, compute-bound workload are relatively straightforward to estimate. In contrast, estimating the memory needs of multiple related applications is difficult and fragile.

It will also be appreciated that the amount of memory available to an application has a significant impact on performance. As one example, accessing paged memory has higher latency than physical memory by up to six orders of magnitude, so any change in the number of page faults an application makes may cause significant slowdowns. Even some of the earliest works in operating systems recognized that applications can experience a nearly unbounded decrease in performance with a small decrease in available physical memory.

For example, FIG. 1 shows the effects of physical memory size on application performance 100. Here, the application's throughput 105 decreases exponentially with a linear decrease in the amount of available memory 110 to that application. Hence, sizing a machine's physical memory correctly is critical for an application's performance and operating cost. Based on this understanding, there is a significant need to improve how resources are allocated in a cloud environment in order to efficiently utilize those resources while providing good user experiences.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

The disclosed embodiments relate to systems, methods, and devices that reactively scale resources for memory-intensive applications and that automatically adapt to workload changes with no pre-specified thresholds.

In some embodiments, a miss ratio curve (MRC) is generated for an application, where the MRC is generated based on application runtime statistics that are extracted from or associated with the application. The application's MRC is then modeled as a hyperbola. A particular area of the hyperbola is then identified. This area corresponds to a point where the MRC is determined to satisfy a specific flatten threshold. A resource allocation threshold is then established based on the identified area. This resource allocation threshold indicates how many resources are to be provisioned or allocated for the application. The resources that are to be provisioned for the application are then scaled using a resource scaling policy, which itself is based on the resource allocation threshold. In this regard, the embodiments are able to respond to dynamically fluctuating workload requirements by scaling up or down resources in accordance with the resources scaling policy.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
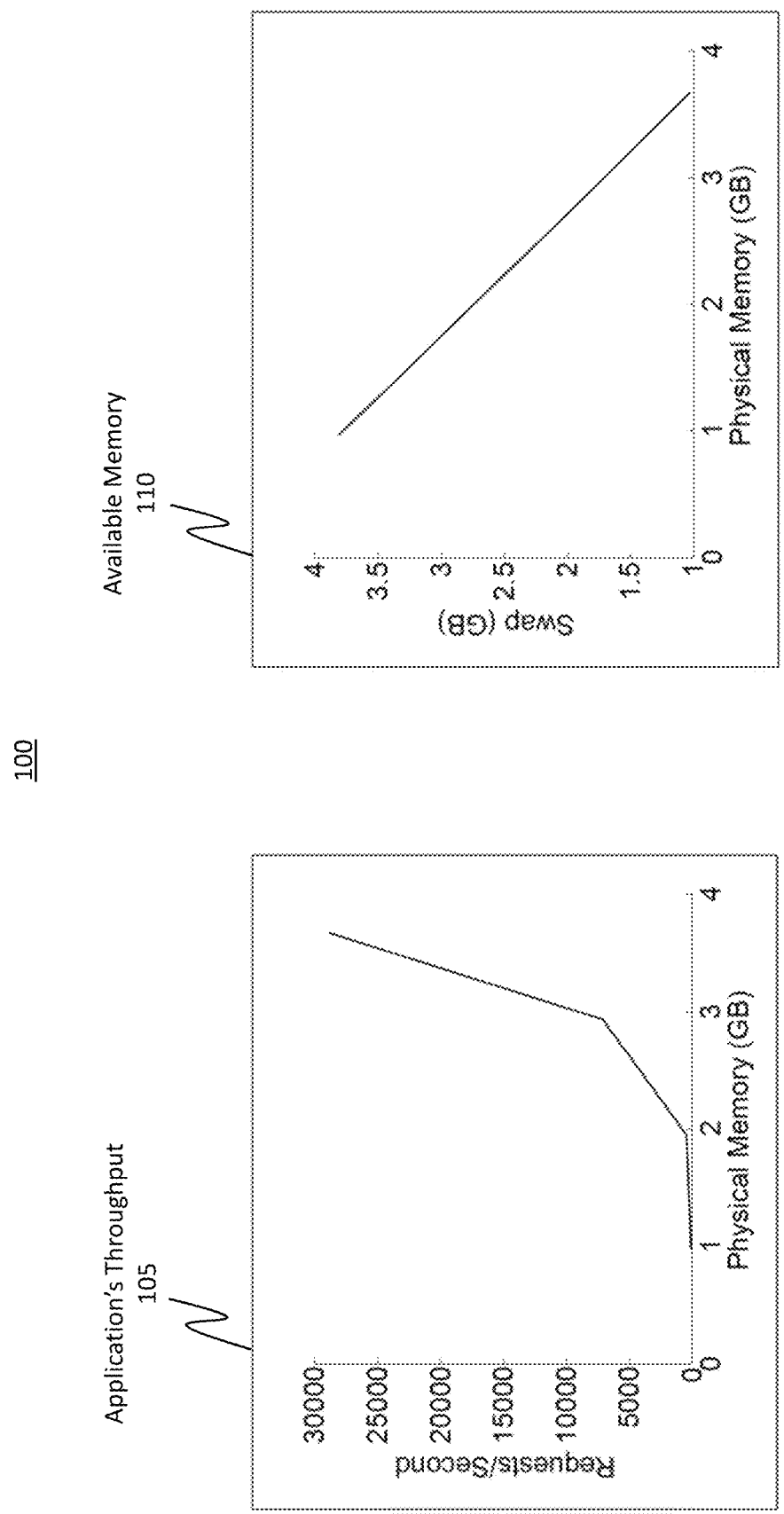
FIG. 1 illustrates how an application's performance is dependent on the amount of physical memory the application is allocated.

The disclosed embodiments generally relate to systems, methods, and devices that improve how resources are allocated in a cloud computing environment by analyzing a miss ratio curve (MRC). As used herein, an "MRC" describes how many misses/page faults an application would expect to experience per unit time (y-axis) for various memory sizes (x-axis). Generally, a "page fault" refers to a scenario where a program/application has attempted to access a unit of data that is supposed to be located at a particular address space, but the data is not presently in the system's memory (e.g., RAM). In other words, a page fault is an interrupt that occurs when data is requested, but the data is not in real memory.

In some embodiments, a miss ratio curve (MRC) is generated for an application, where the MRC is generated based on application runtime statistics that are extracted from or associated with the application. The application's MRC is then modeled as a hyperbola. A particular area of the hyperbola is then identified. This area corresponds to a point where the MRC is determined to satisfy a flatten threshold. A resource allocation threshold is established based on the identified area. This resource allocation threshold indicates how many resources are to be provisioned for the application. The resources are then scaled using a resource scaling policy, which is based on the resource allocation threshold. In this regard, the embodiments are able to respond to dynamically fluctuating workload requirements by scaling up or down resources in accordance with the resources scaling policy.

Examples of Technical Benefits, Improvements, and Practical Applications

The following section outlines some example improvements and practical applications provided by the disclosed embodiments. It will be appreciated, however, that these are just examples only and that the embodiments are not limited to only these improvements.

The disclosed embodiments provide substantial benefits and improvements over the conventional technology. For instance, by following the disclosed principles, developers no longer need to manually predict and continuously profile applications, thereby resulting in substantial increases in efficiency on both the developers' parts and on the computer systems' parts. Developers also no longer need to prematurely express, or rather predict, application workloads and provide those fragile predictions to cloud providers. Instead, an improved technique for application scaling and provisioning is disclosed herein.

For instance, in accordance with the disclosed improvements, applications initially undergo a lightweight online profiling to understand their compute and memory use. Then, memory miss ratio curves (MRCS) are extracted and "natural thresholds" in these curves are identified, where the natural thresholds map to similar operating points or resource requirements that a tenant would choose while allocating resources. In this manner, the disclosed embodiments map resources to a sensible, easy to identify operating point on these curves. The results are also conservative enough to avoid so-called "thrashing" yet are aggressive enough to avoid wasting resources. As used herein, "thrashing" refers to a condition in which computing resources are being overused.

The disclosed principles are easily flexible and adapt well when workloads change. Furthermore, the disclosed techniques require no user-defined or pre-set thresholds. In this manner, significant benefits may be achieved because resources can be allocated more efficiently, more accurately, more dynamically (e.g., on the fly), and can be expressly tailored to suit any need of a tenant. This makes it worry-free for tenants, and it adapts even as workloads evolve. While traditional techniques were inadequate for memory-bound applications (e.g., because even a small decrease in the amount of memory available to an application resulted in dramatic, almost unbounded impact on performance), the disclosed embodiments are easily scalable and can respond dynamically (e.g., in real-time) to memory allocation fluctuations.

Auto-Scaling Cloud-Based Applications

As indicated above, the embodiments are able to dynamically determine an operating point with regard to the amount of resources to allocate for an application. To clarify, the disclosed embodiments are able to determine an optimal memory-based operating point without setting a specific memory requirement threshold.

To determine a natural threshold for memory-intensive applications, the disclosed embodiments automatically analyze an application's miss ratio curve (MRC) and model the MRC as a hyperbola. In many cases, a memory or resource scaling policy operates at the point where the MRC curve flattens (i.e. at its intersection with its latus rectum (LR)).

The disclosed embodiments use a particular approach to construct and analyze MRCS at runtime, where this new approach captures memory references from a memory slice (i.e. an allocated section of memory that has been allocated in a manner so as to be generally similar in size to other allocated memory sections) of any scalable application as it executes on standard virtual machines from any major cloud provider. This approach of provisioning application memory capacity is demonstrated using the intersection of an application's MRC with its LR. The disclosed implementations and evaluations show that, although the LR does not require tenants to set thresholds, it is effective in horizontally and vertically scaling memory-intensive workloads to save on operating costs while avoiding queuing, thrashing, or collapse. As used herein, "horizontal scaling" generally refers to adding more computing devices (e.g., virtual machines, servers, etc.) into the available set or pool of resources while "vertical scaling" generally refers to adding more processing power or compute (e.g., CPU, RAM, etc.) to an existing resource (e.g., a virtual machine).

The embodiments identify the natural threshold by beneficially plotting the miss ratios on a graph and by curve fitting a hyperbola to that miss ratio data. With regard to the natural thresholds, the "knee" portion of a graph (i.e. a point on the graphed curve where a change in the curve's vertical axis is substantially similar or perhaps even equal to a change in the curve's horizontal axis) may work as a natural threshold in a resource-performance graph, though relying on the knee is often overly conservative for memory-bound applications. It will be appreciated, however, that such natural points in the graph create opportunities to avoid user-specified thresholds.

Figure 2:
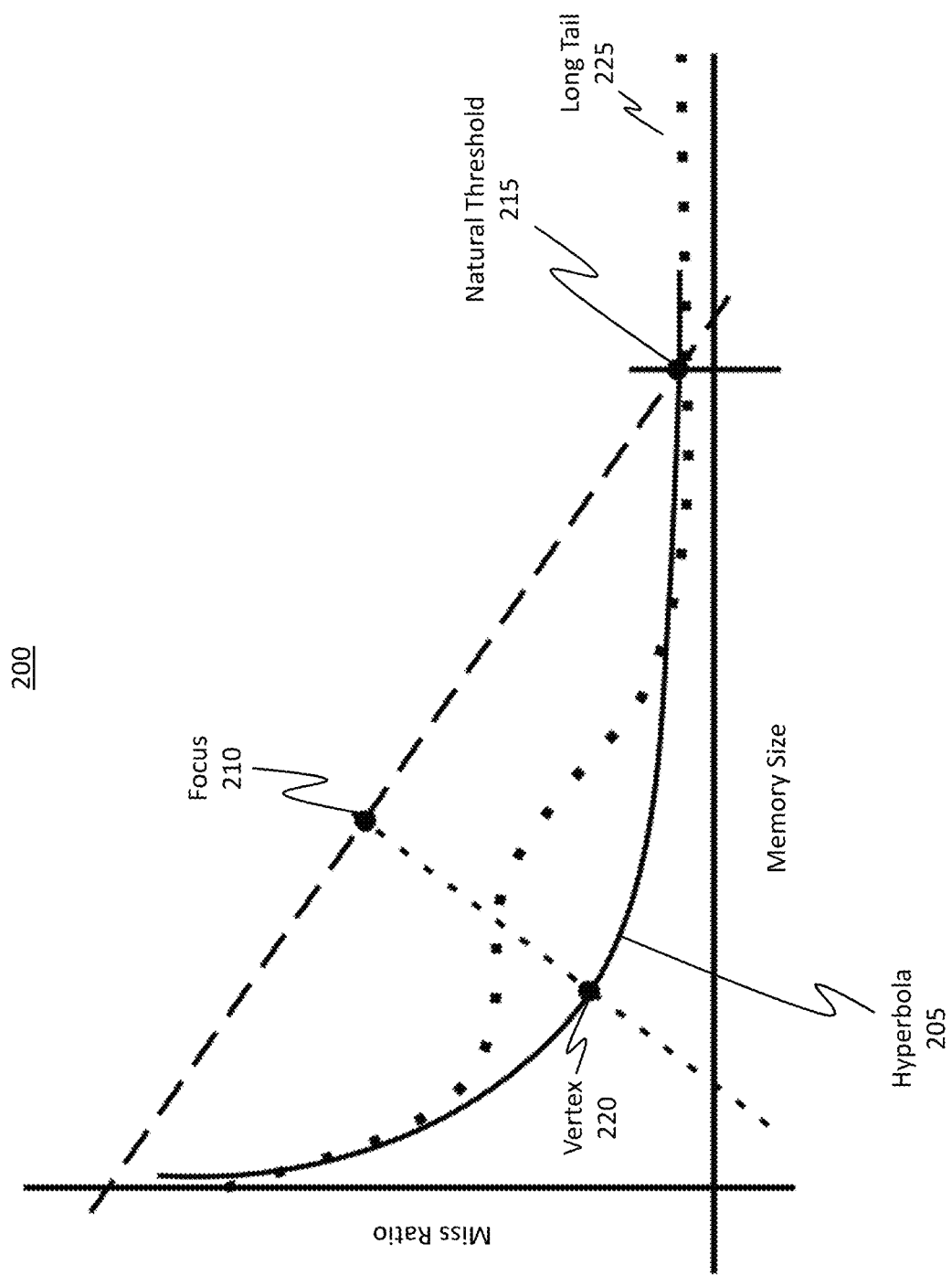
FIG. 2 illustrates how a miss ratio curve (MRC) can be modeled as a hyperbola to identify a natural threshold point.

FIG. 2 illustrates how the disclosed algorithm estimates the memory needs of an application using no prespecified threshold. In particular, the embodiments continuously sample (e.g., for at least a predetermined period of time) a small or determined number of memory accesses to extract miss ratio data, which is then plotted as a miss ratio curve (MRC) using a curve fitting technique, as shown by MRC model 200 to plot a hyperbola 205. A hyperbola (e.g., hyperbola 205) is defined in the following way: for two foci points (e.g., one of which is focus 210), a hyperbola is the locus of points where the difference between the distance to each focus (e.g., focus 210) is constant. In this regard, the focus 210 helps define the hyperbola 205.

A miss ratio curve (i.e. the hyperbola 205) describes how many misses/page faults the application would expect to experience per unit time (y-axis) for various memory sizes (x-axis). Even a handful of page faults can dramatically hurt performance. As used herein, a "page fault" refers to a type of interrupt that occurs when an application requests data, but the data is not currently stored in real memory.

To pick a natural threshold 215, the disclosed embodiments map a quadratic curve (i.e. hyperbola 205) over the sampled miss ratio data extracted from or associated with the application. The knee in the curve (e.g., located at vertex 220) is another natural point. Notably, however, choosing vertex 220 as the threshold will be too conservative because adding more memory to satisfy the vertex 220 memory requirement would actually provide diminishing improvements in page faults. For instance, an operator could easily double DRAM usage to reduce page faults by 2× since it would result in a nearly 2× performance benefit.

Instead, the disclosed embodiments try to more accurately model the tail of the MRC, and a different natural threshold is chosen. This so-called "different" threshold (i.e. the natural threshold 215) lies to the right of the knee at the intersection of the curve and its latus rectum (LR). Intuitively, memory scaling policies should operate at the point where the curve flattens, which is what the LR identifies. MRCS have long tails 225, so this threshold avoids wasting memory where there is little gain while still delivering a low miss rate. Finally, modeling the MRC as a curve also tends to remove performance cliffs (e.g., MRC concavity that can be hard to optimize around) in which small changes in allocated memory leads to large changes in miss rate.

There are no conventional methods to obtain the MRC of an arbitrary application at runtime without modifying the application or tracing only specific portions of the application (e.g., the application's caching layer). A new approach of constructing and analyzing MRCS at runtime is provided herein by capturing memory references from a slice of any scalable application while the application executes. Such capturing may be performed with standard virtual machines (VMs) available from any major cloud provider.

One challenge with scaling memory-intensive applications is the tens of seconds or even minutes it takes for a newly provisioned VM to launch. Further, it takes time to redistribute state to the new VMs if required by the application. This VM launch time challenge is mitigated by using cloud functions (CFs) as interim resources until a new VM becomes ready. CFs are lightweight computing elements available in a cloud platform. In some implementations, CFs are small and short lived and do not maintain state when decommissioned (i.e. the CF refrains from maintaining state). However, when used for short durations, they provide additional computing power and memory, which is useful while VMs continue to launch.

Some embodiments build a reactive auto-tuning method to scale resources for cloud-based memory-intensive applications using combinations of VMs and CFs. Existing reactive methods to scale cloud-based resources (e.g., CPU and memory) require prior knowledge of the expected workload. If the runtime workload changes, traditional techniques are no longer sufficient to scale resources effectively. To address such changing needs, a reactive auto-tuning method is provided herein to scale physical memory that instead adapts to fluctuations in workloads based on runtime measurements. In this regard, the embodiments scale how much memory is allocated to an application by refraining from requiring prior knowledge of an expected workload of the application. Similar to the way TCP probes a network for available bandwidth, the disclosed techniques probe the system for the required memory using the MRC threshold as a starting point or baseline.

Some embodiments, therefore, contribute a real-time algorithm that reactively scales resources for memory-intensive applications in the cloud and that automatically adapts to workload changes having no pre-specified thresholds. Additional contributions include, but are not limited to, a new approach to guiding scaling decisions that relies on extracting natural thresholds over models extracted from application runtime statistics. The disclosed embodiments also model application MRCS as hyperbolas and identify intersection of those hyperbolas and their latus rectums as natural thresholds that are well-suited to applications where cache misses/page faults are costly.

A new and inexpensive mechanism for computing an application's MRC at runtime is also provided, where this mechanism uses a modified hypervisor to collect memory traces. In some cases, the natural threshold effectively computes appropriate memory sizes that reduce operating costs, avoid thrashing or storage-bound performance, and avoid the need to pre-specify any thresholds like target latency. The disclosed embodiments also use cloud functions as temporary memory to absorb increases in offered workload as VMs launch. Accordingly, the disclosed techniques implement the system on a major cloud provider platform and evaluate it by horizontally and vertically scaling memory-intensive applications.

Memory Sizing Impact on Performance

As described earlier in connection with FIG. 1, memory sizing has a non-linear impact on performance. Determining the amount of memory a scalable application requires at runtime in a robust way relies on combining and extending a number of different ideas including MRCs, natural thresholds, and miniature simulation. Implemented properly, these techniques can apply to a wide range of application classes.

Performance vs. memory exhibits a non-linear relationship. A non-linear increase in latency with a linear decrease in physical memory was shown in FIG. 1. These plots were generated by running a benchmark application against a Redis key-value store at various amounts of physical memory on a Linux machine with a maximum of 4 GB RAM and 4 GB swap space on a solid state drive (SSD).

For each execution of the benchmark application, the physical memory available to the application was limited and the number of requests per second the benchmark application was able to make to the server to store keys was recorded. FIG. 1 showed both the number of requests per second and the amount of swap used at each amount of available physical memory.

In that scenario, the request rate dropped exponentially with a linear increase in used swap space caused by a corresponding decrease in available physical memory. Running on SSD media showed exponential decrease in performance. Magnetic disks would show even faster decay. Based on these observations, therefore, it is highly desirable to allocate sufficient main memory to prevent an application from paging to virtual memory.

MRC Model

Figure 3:
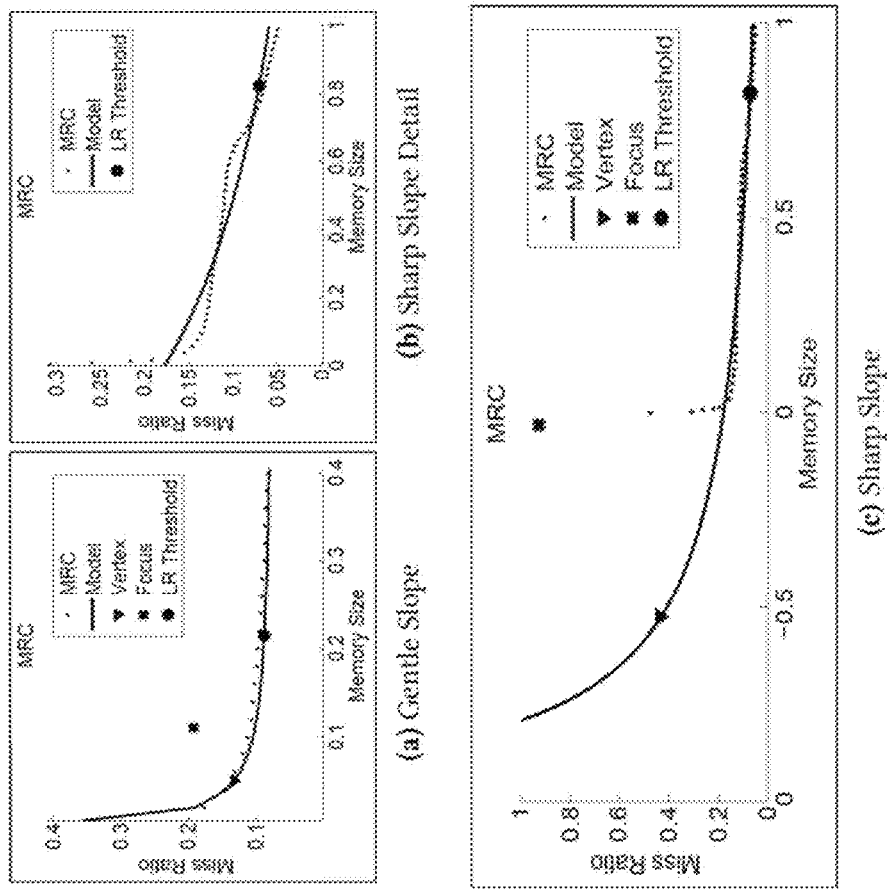
FIG. 3 compares various location values on the MRC model.

A miss ratio curve (MRC) shows the ratio of cache misses to the total number of cache references as a function of cache size. The MRC will change over time as the patterns in the workload change. An MRC may have multiple performance cliffs where a small change in the amount of memory leads to large changes in the miss ratio. FIG. 3 shows two very different MRCs obtained from the applications during an evaluation. The horizontal axis is normalized for illustration. Plots A and B in FIG. 3 are enlarged for detail. In Plot A, the MRC (dotted line) has a gentle slope in the area around the vertex knee and does not contain a performance cliff. The MRC in Plot 3, on the other hand, has a sharp slope on each side of the knee and a performance cliff toward the right side of the figure. Plot B shows the detail of the cliff.

The MRC is modeled as a hyperbola (solid line). When the slope near the vertex knee is gentle as in Plot A, the hyperbola models the entire curve very closely. When the slope is sharp, it fits the tail very well and this is the portion of the MRC beneficial to choosing the natural threshold. The Plots in FIG. 3 show key locations on the model including the vertex knee where the change in the horizontal axis equals the change in the vertical axis, the focus of the hyperbola, and the intersection of the LR with the hyperbola. The latter is the natural threshold; though other operating points on the MRC are possible. For example, it is tempting to choose the vertex knee. Here, however, it is not beneficial to use the vertex knee with the hyperbola model (e.g., see Plot C) because it can compute a threshold to the left of the vertical axis. The actual vertex knee of the MRC can be obtained by searching the data for a slope of −1. This location tends to lead to oscillation and does not provide a cushion for a sudden change in offered load that may push the knee farther to the right, resulting in too little memory and more frequent page faults. The MRC model is generated based on data collected about the application's memory references.

That said, sampling all of the memory references of a running application is prohibitively expensive in terms of computing resources. As such, it is beneficial to rely on a so-called "miniature simulation."

A miniature simulation emulates a cache of any given size by sampling a spatially-hashed subset of memory references at a sampling rate R. In this regard, obtaining a highly accurate estimate of memory references with a mean absolute error (MAE) on the order of 0.003 with a sampling rate R=0.001 can be achieved. The output of the simulation can be passed to a standard MRC generator. The results are divided by the sampling rate R to obtain an estimate of the MRC of the full set of memory references.

Current commodity hardware does not typically support sampling memory references on a running VM. As such, a Quick EMUlator (QEMU) hypervisor's memory management unit (MMU) emulator can be modified to capture memory references from the guest OS running on the hypervisor. Capturing memory references in this manner is agnostic to the guest OS and to the applications running on the guest. The hypervisor can then be run on a standard cloud provider VM, and the emulated guest OS and application can be run on the hypervisor. The emulated VM runs slowly and may not be best suited for applications with hard deadlines; however, it is sufficiently fast to capture a subset of memory references for MRC computation. Further, it is often expensive to emulate the full workload on multiple machines running the hypervisor. Running a subset of the workload on a single emulated VM, similar to the concept of cache miniature simulation, is sufficiently fast to compute the MRC.

An estimate of the MRC is obtained by combining both techniques: running a subset of the workload on the hypervisor VM and performing a miniature simulation on the memory references captured on the VM. The output of the MRC is divided by the product of the sampling rates of the workload and the memory references to obtain the MRC estimate.

At the most general level, it is possible to use MRCs on any memory intensive application that scales. To demonstrate, it is beneficial to look specifically at the class of applications that have a measurable queue. This class includes (i) the caching tier of a web application where the queue is the TCP connection backlog and request queue at the front-end web servers, (ii) batch processors with an explicit work queue, and (iii) IoT servers also with an explicit work queue. A simple scaling algorithm can be designed to evaluate the MRC thresholds on this class of applications.

CFs are used as temporary computing devices to run an instance of the application as a VM launches. This use of CFs is applicable to any application that is scalable; however, since CFs are not guaranteed to maintain state over long durations, it is most beneficial to the class of applications that do not need to maintain state, specifically, batch processors and IoT servers. That said, CFs do maintain state over short durations, and they can be used only temporarily while launching VMs. Thus, they are beneficial to caching applications as well. Caching applications accumulate state and become more efficient over time. Because CFs do maintain state over short times, they can be used as efficient short-term caching nodes.

When the VM has launched, it begins to accumulate state and the CF can be terminated. At this time, there is a decrease in caching performance, but only for a short time while the VM accumulates as much state as the CF had when it terminates. To demonstrate and evaluate these methods, two specific instances of the application classes are focused on. Specifically, (1) a Redis caching cluster and (2) a batch processing server farm that applies a watermark to high resolution images are used.

Applications and Systems

Figure 4:
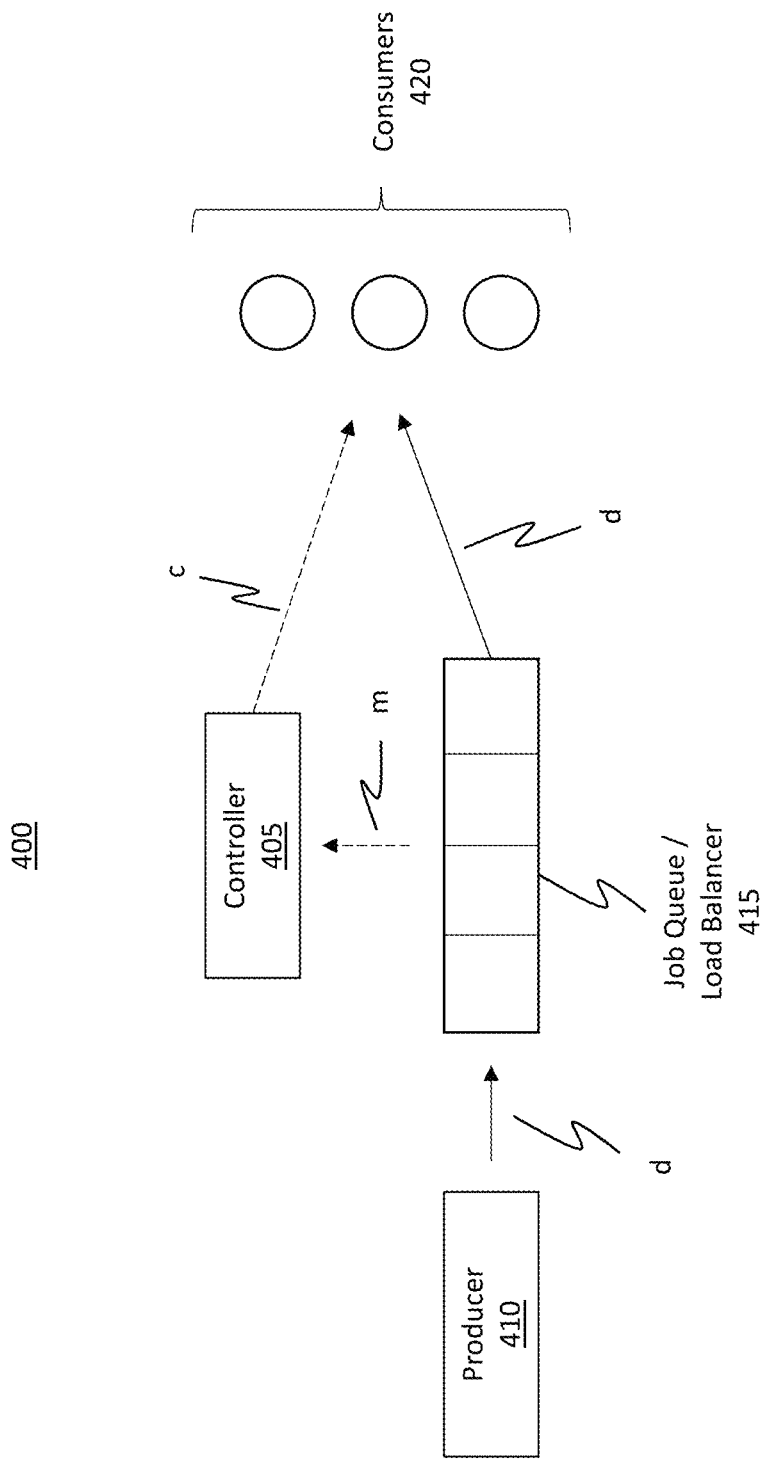
FIG. 4 illustrates an architectural model for controlling resources provided to an application.

FIG. 4 shows the architectural model 400 of an example application. It is a producer/consumer or client/server model with a queue. In particular, architectural model 400 is shown as including a controller 405, a producer 410, a job queue/load balancer 415, and any number of consumers 420. These different components are able to interact and communicate one with another. This model supports a wide variety of applications including publisher/subscriber (pub/sub) and web server-based request/response (req/resp) applications. For pub/sub, an explicit queue holds pending jobs. The jobs can either be pushed to VMs and CFs through a job queue/load balancer 415 or pulled from the application. For web server applications, the queue is the TCP backlog and request queue at the load balancer. The load balancer routes requests to the VMs and CFs.

Figure 5:
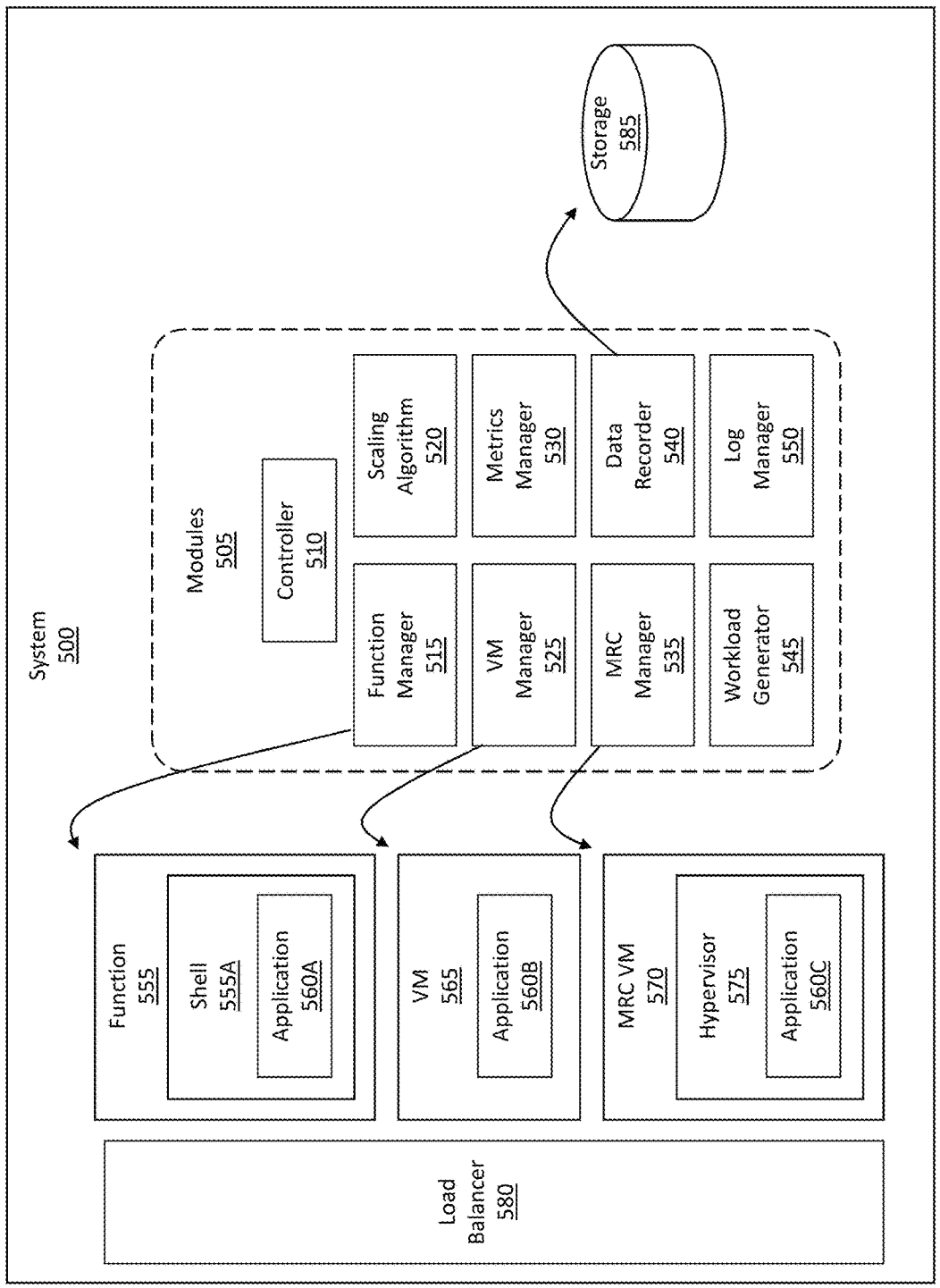
FIG. 5 illustrates some example system components that may be used to control how resources are allocated to an application.

FIG. 5 shows a system 500 comprising various components and modules 505. System 500 may be used to execute the application that was described by the architectural model 400 of FIG. 4.

In FIG. 5, modules 505 are shown as including (i) a controller 505 to coordinate the other components (e.g., Function Manager 515, Scaling Algorithm 520, VM Manager 525, Metrics Manager 530, MRC Manager 535, Data Recorder 540, Workload Generator 545, and Log Manager 550); (ii) CFs (e.g., Function 555 with its corresponding shell 555A) and VMs 565 and 570 (with perhaps a corresponding hypervisor 575) that run applications 560A, 560B, and 560C under evaluation; (iii) the job queue or load balancer 580 to distributes jobs or requests to the applications 560A-560C; (iv) metrics sources including the provider's metrics systems, VMs, CFs, and the job queue or load balancer; (v) persistent storage 585 to record data for analysis; and (vi) logging to the provider's logging subsystem.

To execute pre-compiled applications on a CF (e.g., Function 555), it is beneficial to create a shell (e.g., shell 555A) in a provider-supported CF runtime. The shell 555A interfaces with the underlying operating system to execute the applications (e.g., application 560A). The same applications can be run on CFs (e.g., Function 555) as well as on VMs (e.g., VMs 565 and 570). An API can also be added to the shell 555A that the controller 510 uses to instruct the shell 555A to start, stop, pause, or resume the applications as need.

In addition to monitoring VM statistics (e.g., CPU utilization and memory consumption), the controller 510 monitors the job queue/load balancer 580 for metrics (e.g., "m" in FIG. 4) including the arrival and departure rates. For pub/sub applications, it is beneficial to measure the queue in terms of the number of jobs waiting to be processed. For web server applications, some embodiments measure the number of pending TCP connections and receive queue length.

The controller 510 coordinates activities of the other modules 505. For instance, the controller 510 initiates scaling operations and registers or unregisters VMs and CFs with the load balancer 580. The Function Manager 515 calls a cloud service provider (e.g., AWS Lambda) to create and destroy CFs. It can also call the CF API to start or stop the applications. The VM Manager 525 instructs the cloud platform to create or destroy VMs.

The MRC Manager 535 receives memory references from the MRC VM 570. It periodically re-generates the MRC and provides it to the Scaling Algorithm 520. It is possible to compute the MRC by executing a small fraction of the workload on a separate VM running the QEMU hypervisor. This method is applicable to any application where a small fraction of the workload can be replicated and distributed to the VM running QEMU. The MRC Manager 535 collects memory references from the VM running the QEMU hypervisor. A demonstration on how an algorithm may use the MRC to make scaling decisions based on memory usage is provided later.

The Workload Generator 545 produces the workload based on pluggable generator modules. It is possible to write generator modules that include any type of cloud serving workloads and pre-recorded trace files. The Scaling Algorithm 520 is a pluggable module that determines the desired resources given the current set of metric measurements. The Metrics Manager 530 queries various sources for measurements including the provider platform, the job queue or load balancer 580, application VMs, CFs, the MRC VM 570, and the Workload Generator 545. Cloud providers make CPU utilization and work queue metrics available through their platforms. It is possible to collect these metrics as well as provide a custom component that runs on the VMs that collects metrics not implemented by the cloud providers.

For example, some cloud platforms run a guest OS application to collect memory statistics. It is possible to implement an application that integrates directly with the controller 510. This gives the embodiments more control and extensibility than relying on provider implementations that may or may not give the same set of metrics. The Metrics Manager 530 is configurable to collect metrics either at the cloud provider's frequency or at a periodic interval.

The Data Recorder 540 saves real-time performance data to persistent storage 585 for later analysis. The Log Manager 550 manages cloud-based logs. The Load Balancer 580 routes data to applications running on the VMs. It marshals data to applications running on CFs through the CF API.

Cloud Function Operation

CFs are lightweight processing units offered by all major cloud providers. They are typically implemented as containers that run for a determined duration on the order of at most 5 minutes per request. Providers pre-load CFs with runtimes including Java, JavaScript/NodeJS, Python, and C#. They provide an SDK for each runtime in which programmers develop code. The programmer registers the CF code with and uploads it to the provider's CF system.

The interface from the outside world to a CF takes the form of a provider-specific API. It is possible to write a custom load balancer that interfaces with the API. It marshals application jobs and requests to the CFs so the application does not need to interface with the cloud provider's CF API. The load balancer interface is modular and can be replaced with implementations for additional cloud providers.

CFs typically have their own runtimes but run on a standard underlying OS. It is possible to execute any application on them that can be compiled to a user-level binary. To execute pre-compiled code on a CF, some embodiments create a shell in a provider-supported CF runtime. The shell interfaces with the underlying operating system to execute the applications. Some embodiments then run the same applications on CFs as on VMs. Furthermore, some embodiments add an API to the shell that the controller uses to instruct the shell to start, stop, pause, or resume the applications as need.

CFs are typically more resource limited than VMs, but industry trends are closing the gap. For example, some cloud providers recently doubled the available CF memory from 1.5 GB to 3 GB. CFs will increasingly be able to run heavier workloads. Current CF resources are sufficient for many applications such as those that are evaluated.

With these observations, it is beneficial to use CFs to temporarily absorb increases in offered workloads as VMs come online. When the controller determines new VMs need to be launched to increase total system memory, it launches a VM paired with as many CFs as are necessary with aggregate memory equal to the VM. As the VM slowly comes online, the embodiments route requests to the CFs to immediately begin processing them. When the VM is online, the embodiments terminate the CFs and shift workload to the VM. The state that has accumulated in the CF is lost when a shift to the VM is performed; however, since the CF is online for a short time, the state will be minimal. For example, in a batch processor, no state is required between handling of requests. In a caching application, the cache that accumulated in the CF will be lost, but it will quickly repopulate in the VM. In this case, there will be a temporary performance penalty as the cache repopulates; however, it is still a benefit over not using the CFs as temporary memory.

CF Executables and APIs

Although cloud providers pre-load CFs with runtimes, it is beneficial to regard the CF as a shell that interfaces with the underlying OS. Some embodiments disclosed herein execute applications on CFs that do not depend on the runtimes but instead run on the underlying OS. Application code may be written in any language that compiles to a user-level executable.

Providers allow the requester to pass query parameters to CFs. As such, it is beneficial to create an application programming interface (API) to communicate with the CF and embed it in the parameters (i.e. parameters of requests are formatted in accordance with the API specification). The API is then used internally. The applications do not need to be coded to this API. As shown in Table 1, below, the API may include commands to (i) start and stop the applications on the CF at system initialization and shutdown, respectively; (ii) pause and resume the applications during scale out operations; (iii) keep the CF warmed in the provider's CF cache to minimize cold starts; (iv) retrieve metrics from the CF; (v) give the CF time to execute on the provider's platform with a long-running query; and (vi) proxy and marshal jobs and web requests and responses from the load balancer to the application running on the CF.

TABLE 1

Function API

| Command | Description |
| --- | --- |
| start | Launches the applications. |
| stop | Terminates the applications. |
| pause | Suspends the applications. |
| resume | Resumes the applications. |
| keep alive | Performs no action. This is effectively a no-op that keeps the CF warmed on the provider's system so minimize cold starts |
| status | Long running request to retrieve system metrics and to give the CF time to execute on the provider's system. |
| proxy | Proxies jobs and web requests/responses to from the applications. |

Controller Interaction

When the controller 510 from FIG. 5 is started, the Function Manager 515 creates a pool of CFs. For each CF in the pool, the Function Manager 515 sends a start command to load the applications into the CFs. It then sends a pause command to suspend them until needed for a scale out operation. The Function Manager 515 periodically sends keep alive commands to the CFs to keep them warm. In this regard, when the resource scaling policy is implemented, an initial pool of CFs is initiated. These CFs are then caused to operate in a suspended state until such time as an increased memory requirement of the application is detected. Each CF in the pool is initially loaded with a corresponding instance of the application. In this manner, the CFs are able to immediately perform work for the application while the VM is being launched.

When the controller 510 starts a scale out operation, the Function Manager 515 sends the CF a resume command to resume execution of the application. As long as the scale out is in progress, the Function Manager 515 continually sends long-running status commands to the CF. The shell (e.g., shell 555A) performs two actions when it receives the command. First, it retrieves metrics from the OS. Second, it gives the CF (e.g., Function 555), and consequently the applications (e.g., application 560A), time to execute. When the controller 510 determines that a scale out is complete, the Function Manager 515 sends the CF a pause command to suspend the applications. The Function Manager 515 discontinues sending long-running status commands in this state. When the controller 510 is terminated, the Function Manager 515 sends the stop command to the CF to perform an orderly shutdown of the application.

CFs are kept in the provider's CF cache by sending requests to them. However, the CFs are not required to be cached. The cache state of a CF is provider implementation-dependent. Cold starts are much faster launching compared to a VM and benefits can be achieved regardless of whether the CF is in cache or not.

Miss Ratio Curves

A miss ratio curve (MRC) shows the ratio of cache misses to the total number of memory cache references as a function of cache size. If the physical main memory of a VM is viewed as the cache for the disk-based swapping of virtual memory, then MRCS can be used to determine the amount of main memory required by an application. This information is then used to determine the memory requirements of a scaled-up version of the system.

The MRC will change over time as the patterns in offered workload change. The MRC is recomputed periodically and memory resources are scaled at runtime. While it is computationally expensive to construct an MRC from all memory references, it is beneficial to sample a small subset of spatially hashed memory references to efficiently construct an MRC with a high degree of accuracy. It is also beneficial to further reduce the size of the memory trace by recording page accesses rather than individual memory locations. A page (e.g., 4096 bytes in Linux) is the minimum amount of memory the OS allocates and MRC accuracy is not lost by recording the page reference.

Some embodiments record a spatially hashed subset of memory references. It is possible to determine if a memory reference should be recorded. To do so, some embodiments capture memory references from the QEMU hypervisor running on a live VM and pass them to the controller. The controller divides the memory reference by the page size before computing the MRC. The output of the MRC is the number of pages scaled down by the sampling frequency. The controller multiplies the MRC results by the sampling frequency to obtain the memory required by the VM. Some embodiments then distribute a fraction of the workload to the VM running QEMU so that only a single extra VM is needed to compute the MRC. The controller multiplies the MRC results by the fraction of jobs not sent to the QEMU VM to scale the MRC up to the full system workload.

Figure 6:
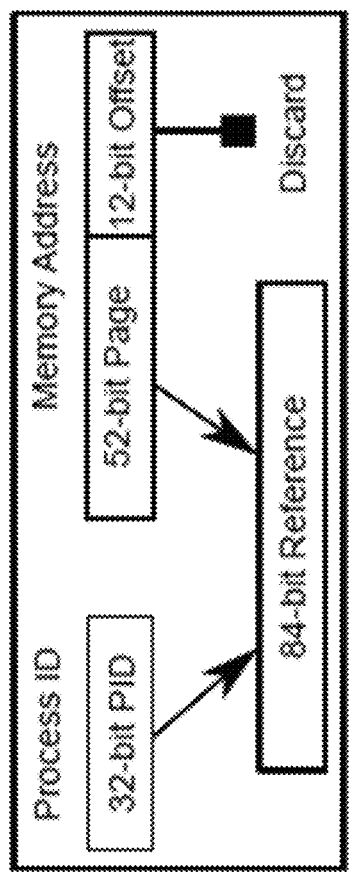
FIG. 6 illustrates an MRC memory reference.

Since each process has its own virtual memory space, it is beneficial to include the process identifier (PID) to create an OS-wide unique memory reference. As shown in FIG. 6 by the MRC memory reference 600, some embodiments combine the 32-bit PID with the 52-bit page number to create an 84-bit memory reference. The lower 12-bit page offset of the virtual memory address can be discarded. Then, some embodiments use an efficient application to compute the MRC. An example implementation has a 76-bit address space. The code can be modified to extend it to 84 bits to allow for the inclusion of the 32-bit process identifier in the memory reference.

Some modern CPUs may not provide hardware support to allow software to capture accessed memory addresses. The disclosed techniques provide for a method to capture the memory accesses used to compute an MRC on a running system.

For instance, at runtime, the embodiments duplicate and route a fraction of the offered workload to a single VM running the QEMU hypervisor. In some cases, the embodiments do not run QEMU on the other VMs in the system. Instead, the embodiments execute the application being analyzed on the guest OS of the hypervisor. It is possible to then modify QEMU to sample a subset of memory references of the guest OS. Subsequently, they can be streamed over a network to the controller running on a separate machine. The controller generates the MRCs to determine how much memory the system requires. The controller scales the VMs first vertically and then horizontally to meet the memory requirements. The controller concurrently runs a probing algorithm to fine-tune the memory to the offered workload.

The embodiments run QEMU with an emulated memory management unit (MMU). The emulated MMU is modified to capture the spatially hashed subset of memory references. In this mode, the guest OS runs slowly compared to other hosts in the network. Consequently, any results the guest OS generates can be discarded, and the guest OS can be used only to take measurements that allow for computing the MRC.

Figure 7:
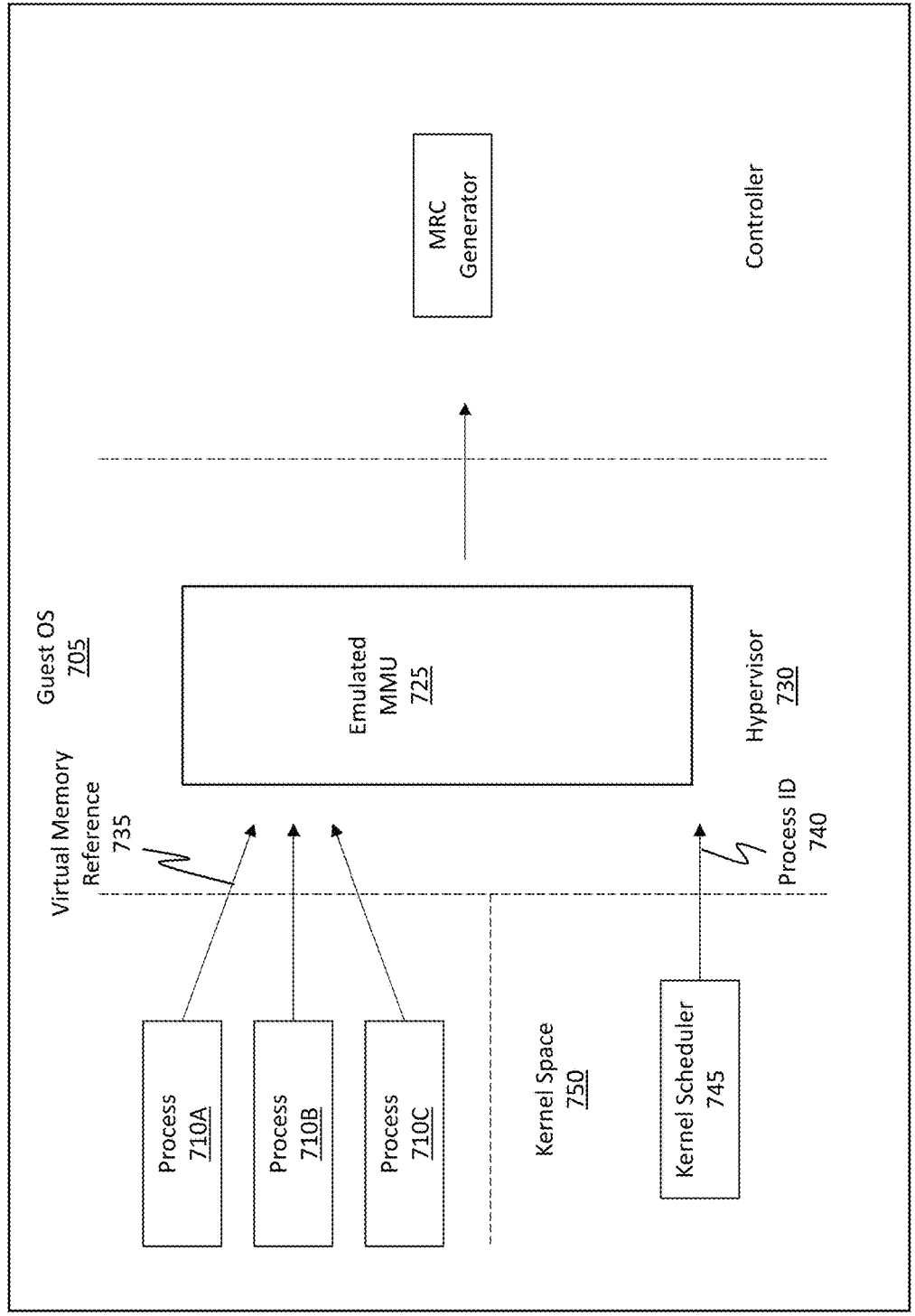
FIG. 7 illustrates one example technique for capturing memory references.

FIG. 7 illustrates how to capture memory references 700 by showing how it is possible to capture the memory references of a guest OS 705. Each process (e.g., process 710A, process 710B, and process 710C) running on the guest OS 705 has its own virtual memory address space. The emulated MMU 725 in the host hypervisor 730 intercepts virtual memory address accesses from the guest OS 705. The emulated MMU 725 maps the virtual address to an emulated physical address.

If a single process dominates memory references, it is not necessary to know which process is accessing memory; however, if multiple processes are memory intensive, then knowledge of the running process identifier 740, which can be obtained from the kernel scheduler 745 managing the kernel space 750, is beneficial to know. The host can know which process in the guest is accessing memory to form a unique memory reference for the MRC trace. If it does not know which process is accessing memory, it may not be able to distinguish memory references in one process from those in another and some implementations will not be able to create an accurate view of the required memory or MRC.

Therefore, it is beneficial to modify the guest OS 705. Immediately after a context switch, the process identifier (PID) is recorded that is scheduled to run on the core for which the context switch occurs. In the host emulated MMU 725, the PID is read when a memory reference (e.g., virtual memory reference 735) occurs. In this way, the embodiments can obtain a guest OS-wide unique memory reference consisting of a PID and virtual memory address pair.

Scaling Resources and Optimization

Some embodiments beneficially create an algorithm to evaluate the effectiveness of the scaling policy. Each iteration of the algorithm first checks if the controller updated the MRC or if the queuing delay has changed. The algorithm establishes an estimate of the required system memory. The algorithm then probes the system to fine-tune the memory to the offered workload.

A key challenge in finding the required system memory size is determining an appropriate point on the MRC at which to operate. Choosing a value too high is inefficient and memory remains unused. Choosing a value too low leads to poor performance as processes run out of memory. Existing techniques require specification of a target latency and use the MRC to determine how much memory to add to meet that target. The disclosed embodiments, however, eliminate the need to pre-specify a target latency. Instead, the embodiments choose a natural threshold in the model of the MRC. The curve can then be modeled as a hyperbola. This tends to remove cliffs from the curve, as was previously shown in FIG. 2. In some cases, a Nelder-Mead simplex procedure is used to fit the data to the hyperbola model.

The following question remains, however: at what level on the curve should the embodiments choose to run the system. It has been observed that MRCs tend to have a very long tail. Setting the threshold too far along the tail is an inefficient use of memory and provides little-to-no benefit to the application. The embodiments, therefore, look for the point at which the curve flattens. The LR is the line through the focus of the hyperbola, perpendicular to the transverse axis. Some embodiments choose the intersection of this line with the hyperbola as the natural threshold. This point is the beginning of the flat part of the curve. This point on the curve indicates a point at which there is sufficient memory in the system and more memory adds little value. Less memory will cause more page faults.

Inspiration can be drawn from TCP (transmission control protocol), which probes a network for available bandwidth. In a similar manner, the disclosed embodiments probe the system for the required memory. As used herein, the term "thread" is used to refer to the set of processes and resources required to handle a request. Table 2, below, defines the variables in the algorithm.

TABLE 2

Algorithm Variables

| Variable | Definition |
|---|---|
| $p_i$ | existing number of threads |
| $p_{i+1}$ | new number of threads. |
| $m_i$ | existing memory in system |
| $m_{i+1}$ | new memory in system |
| f | fraction of requests not sent to MRC machine |
| $h_i$ | existing threshold determined by MRC |
| $h_{i+1}$ | new threshold determined |
| x | measured total departures/sec |
| λ | measured departure rate/thread |
| μ = x/$p_i$ | measured arrival rate |
| δ | change in queuing delay |
| l | true if memory of any VM is low, false if not |
| s | minimum VM physical memory increment size |

In some cases, it is beneficial to consider how two different types of applications use MRCs to scale memory: a caching cluster and a batch processing farm that processes high resolution images. The two applications are distinct in their processing and memory requirements. The same probing algorithm can be used for both applications, but the initial required memory of a scale out event can be computed differently as shown in Algorithm 1, below.

Algorithm 1: Initial Memory Calculation $$p_{i+1} = \begin{cases} f, & \text{caching application} \\ \lceil \lambda/\mu \rceil, & \text{batch processing application} \end{cases}$$

$m_{tmp} = p_{i+1} h_{i+1}$
if ($p_{i+1} \neq p_i$) or // Required threads changed
  ($h_{i+1} \neq h_0$)  // MRC threshold changed
{
  if (δ > 0 and last operation was scale in )
  {
    // Establish new starting point for scale out
    $m_{i+1}$ = max($m_{tmp}$, $m_i$)
  }
}

The caching cluster accumulates state over time and consumes very little CPU. The batch processor requires significant memory and CPU for a short time while processing an image, but does not maintain state between jobs. The amount of memory in the caching cluster is determined by the accumulated state, distributed among all nodes in the cluster. In this case, the MRC threshold ($h_{i+1}$) multiplied by the fraction of requests not sent to the QEMU machine ($p_{i+1}$=f) that computes the MRC is the required memory in the cluster ($m_{tmp}=p_{i+1}h_{i+1}=f_{i+1}$).

On the other hand, the memory in the batch processor is determined by the number of threads in the system. The number of threads required to match the throughput to the offered workload is the arrival rate divided by the departure rate per thread ($p_{i+1}=\lceil\lambda/\mu\rceil$). The required memory is then the MRC threshold multiplied by the number of threads ($m_{tmp}=p_{i+1}h_{i+1}=\lceil\lambda/\mu\rceil h_{i+1}$). It is beneficial to use $m_{tmp}$ if a change is detected in the required number of threads or if the MRC threshold has changed. Some embodiments use it to establish the starting point of the next scale out event; however, some embodiments do not permit a starting point less than the currently allocated memory size. A scale out event begins when the queuing delay increases and the previous event was a scale in event.

Algorithm 2, below, is the probing algorithm. Probing helps right-size memory in three situations.

Algorithm 2: Probing Algorithm if (δ > 0 or l = true)
  $m_{i+1}$ = 2$m_i$  // Multiplicative increase
else if (δ = 0 and l = false)
  $m_{i+1}$ = $m_i$ − s // Additive decrease First, it helps when using a threshold that underestimates or overestimates memory requirements. Second, if the offered workload suddenly shifts, then the MRC estimate will be incorrect until enough new memory samples are collected with the new load. Third, Algorithm 1 will not detect an excess of threads in the batch processor when offered load decreases and the memory in the system will be over provisioned. Probing for less memory will effectively decrease the number of threads and excess memory.

With that understanding, some embodiments use runtime measurements to estimate the average amount of memory a request requires. If a VM does not have enough free memory to process a request, or if the VM is depleted of main memory, some embodiments set a low memory flag (I) for the VM. Some embodiments track this condition for every VM and use it as a control signal to the probing algorithm. The algorithm probes for more memory if the queue is growing (i.e. there are not enough resources to meet demand) or if any VM is in a low memory state.

The algorithm conservatively probes for less memory if the queue is empty and no VMs are low on memory. In this case, there are an excess of resources and it is possible to reduce the memory in the system. There is high penalty in terms of performance when there is too little memory allocated to an application. Some implementations are therefore aggressive when probing for higher memory and conservative when probing for less memory. It is also possible to use multiplicative increases when probing for more memory just as TCP does during slow start when probing for more bandwidth. However, some implementations use a conservative additive decrease when probing for less memory unlike TCP since fairness does not apply. Some embodiments probe lower by the granularity of VM memory size (s) available from the cloud provider.

Some embodiments implement both a batch processing and a caching application on a major cloud provider (e.g., AWS). The batch processor follows a publisher/subscriber (pub/sub) model and the caching application follows a request/response (req/resp) model. It is possible to write custom producer and consumer applications and run them on separate computing devices as shown in FIG. 4. In some cases, they can be written in Java.

Table 3, below, shows the number of lines of code in each component, reported by a Linux tool "cloc." It is possible to make modifications to QEMU to extract the PID from the guest OS. As the application executes on the guest OS, some embodiments record memory references consisting of PID and virtual memory address pairs and stream them to the controller. It is possible to modify the Linux kernel to obtain the PID from the scheduler and export it to the QEMU host.

TABLE 3

Lines of Code

| Component | Number of Lines |
|---|---|
| Controller | 21,543 |
| Consumer | 2,688 |
| Producer | 1,201 |
| Load Balancer | 1,668 |
| AWS Shell | 2,532 |
| Common Libraries | 7,433 |
| QEMU Modifications | 2,143 |
| Kernel Modifications | 312 |
| Redis Controller | 8,354 |
| Total | 47,874 |

The two applications are similar in structure with details below. AWS Elastic Compute Cloud (EC2) can be used for VMs and Lambda for CFs. The producer reads and recreates a pre-recorded network trace. It sends the job or request (e.g., "d" in FIG. 4) to the job queue or load balancer.

Linux can be used on the VMs and CFs. It is possible to specify that the CFs reside on the same subnet as the VMs. The CFs connect to VMs over a virtual private network (VPN). Over these connections, it is possible to measure CF to VM round trip times (RTTs) of 5 ms to 25 ms with a mean of about 18 ms. Some embodiments choose VMs shown in Table 4, below.

TABLE 4

Hardware

| Provider | Application | Machine Type | CPU Type | CPU Clock (GHz) | RAM (GB) | Cores |
|---|---|---|---|---|---|---|
| AWS | Shell/Consumer | CF, Lambda | Intel(R) Xeon(R) E5-2666 v3 | 2.9 | 3.5 | 2 |
| | Job Queue | VM, m3, medium | Intel(R) Xeon(R) E5-2670 v2 | 2.5 | 3.75 | 1 |
| | Consumer | VM, c5 family | Intel(R) Xeon(R) Platinum 8124M | 3.0 | 4-32 | 2-16 |
| | Controller | VM, m3, large | Intel(R) Xeon(R) E5-2670 v2 | 2.5 | 7.5 | 2 |

The cloud provider provisions CFs by the amount of memory requested. Some implementations request 1.5 GB CFs and determine the hardware specifications shown in the table. It is possible to obtain this information from the Linux/proc/cpuinfo and/proc/meminfo files. Although AWS limits the RANI available to the CF processes, /proc/meminfo shows 3.5 GB. The CFs resume from a paused state in 20-40 sec on AWS. The VMs launch and start the applications in 2-3 minutes. It is possible to preload the CF executables onto AWS's cloud storage platform, Simple Storage Service. When a CF is programmatically launched, it is possible to instruct it to pull them from simple storage service.

Web Server Cache—Redis

The behavior of a caching application can be examined by scaling Redis key-value store servers. Some implementations build a Redis cluster controller to automatically, add, remove, reshard, and rebalance nodes in a Redis cluster as the embodiments scale VMs. Resharding and rebalancing are based on the reference implementation. In some cases, it is beneficial to run a YCSB workload on the cluster. The producers are web servers that query the Redis cluster through the load balancer. The consumers are the Redis servers. The load balancer proxies the requests to the Redis servers running on the VMs and CFs. For queuing metrics, it is possible to monitor the TCP backlog and receive queues in the load balancer. The TCP backlog and timeouts can be set high enough in the load balancer that no incoming requests are dropped so that the embodiments can observe scaling algorithm behavior without resorting to tail drop.

Batch Processor—Image Watermarking

As photo and video resolutions continue to increase, memory becomes a significant factor in the ability to transcode them. It also takes more powerful CPUs to process higher resolutions, but increasing the available memory makes a greater difference to throughput than increasing CPU performance. Further, CPUs are often at maximum utilization while transcoding and a higher performance CPU may not be available.

It is possible to demonstrate with an experiment in which some tests watermark high resolution 16K (15360×8640) images with the open source transcoder, ffmpeg. The images at 24-bit color depth consume 380 MB when uncompressed. Some tests run 4 simultaneous instances of ffmpeg on a compute-optimized AWS EC2 C5 VM. Each instance consumes just over 1 GB. The same VM can be used on each experiment and limit the number of cores available to the OS as necessary. Table 5, below, shows the results. Doubling the cores alone has negligible effect on throughput because most of the time is spent servicing page faults. Doubling the memory improves throughput by 54%. Doubling both cores and memory improves it by 74%. The greatest improvement comes from the increase in memory.

TABLE 5

Image Watermark Speedup

| Cores | RAM (GB) | Total Time (Min:sec) | Time Savings (min:sec) |
|---|---|---|---|
| 2 | 4 | 5:38 | 0:00 |
| 4 | 4 | 5:30 | 0:08 |
| 2 | 8 | 2:36 | 3:02 |
| 4 | 8 | 1:27 | 4:11 |

In the batch processor application, some tests use ffmpeg to apply a watermark to high resolution images. It is possible to write a Java wrapper around Apache ActiveMQ for the job queue. The producers (publishers) send the job data to the work queue. The transcoder consumers (subscribers) pull jobs from the queue on a first-come-first-served basis.

Evaluation and Metrics

It is possible to evaluate two natural thresholds of the MRC: the knee computed from the raw MRC data and the LR of the hyperbola model of the MRC. Some embodiments run a YCSB workload on the caching application and a trace from a production transcoder on the image processing application. Each experiment can be launched with a minimum configuration consisting of a single consumer VM with 2 cores and 4 GB RAM and a QEMU hypervisor VM with 4 cores and 8 GB RAM. A baseline of the performance of each application can first be established. In the baseline, a probing Algorithm 2 or CFs are not used. Subsequently, the probing algorithm is added, and finally the CFs.

For each evaluation, the mean metrics shown in Tables 6 and 7, below, can be reported for the caching and batch applications, respectively. The metrics are (i) queuing delay, (ii) amount of memory allocated, (iii) millions of page faults per core, and (iv) throughput in jobs/sec.

TABLE 6

Caching Application Results

| Experiment | Delay (Sec) | Memory (GB) | Faults (M/Core) | Throughput (Reqs/Sec) |
|---|---|---|---|---|
| Baseline, LR | N/A | 16.00 | 0.62 | 495.64 |
| Baseline, Knee | N/A | 8.00 | 0.22 | 336.22 |
| Probe, LR | 118.57 | 19.49 | 1.20 | 384.62 |
| Probe, Knee | 118.20 | 18.92 | 0.97 | 385.18 |
| CFs, LR | 85.51 | 19.72 | 0.79 | 386.51 |
| CFs, Knee | 91.05 | 19.48 | 1.12 | 386.53 |
| Step Probe, LR | 153.54 | 49.05 | 0.03 | 242.40 |
| Step Probe, Knee | 378.06 | 45.38 | 0.03 | 242.57 |
| Step CFs, LR | 83.35 | 48.79 | 0.03 | 242.45 |
| Step CFs, Knee | 338.85 | 45.64 | 0.03 | 242.53 |

TABLE 7

Batch Application Results

| Experiment | Delay (Sec) | Memory (gB) | Faults (M/Core) | Throughput (Jobs/Sec) |
|---|---|---|---|---|
| Baseline, LR | 124.97 | 26.86 | 5.09 | 14.00 |
| Baseline, Knee | 1236.93 | 14.91 | 5.98 | 9.51 |
| Probe, LR | 122.75 | 48.16 | 0.77 | 14.02 |
| Probe, Knee | 255.84 | 47.59 | 1.71 | 13.07 |
| CFs, LR | 22.09 | 31.28 | 2.29 | 13.80 |
| CFs, Knee | 25.78 | 31.01 | 2.82 | 13.80 |

Caching Application

To establish a baseline for the caching application, it is beneficial to disable both probing and CFs. Requests can be made at a high rate to determine the maximum throughput. Since it takes time to redistribute state after a scaling event, some embodiments generate the MRC every thirty minutes and run the experiment for six hours. The MRC threshold converges after one or two scaling events. For the baseline, Table 6 shows the memory size to which the system converges and the page faults per core and throughput at this memory size. The LR shows a 1.5× speedup over the knee.

It is beneficial to run probing and CFs at a constant request rate. Probing begins to scale out before the controller computes the MRC since it takes time to collect memory references. The system does not scale in enough before the second and subsequent scale out events for the MRC calculation to be evident. Probing computes a higher memory requirement than the MRC and Algorithm 1 gives precedence to the higher value. Consequently, probing results are the same for both the LR and knee thresholds. The difference in queuing delay with CFs is from variation in start-up time. Some tests do see significant decrease in queuing delay between probing without CFs and probing with CFs, on the order of 25%.

Figure 8A:
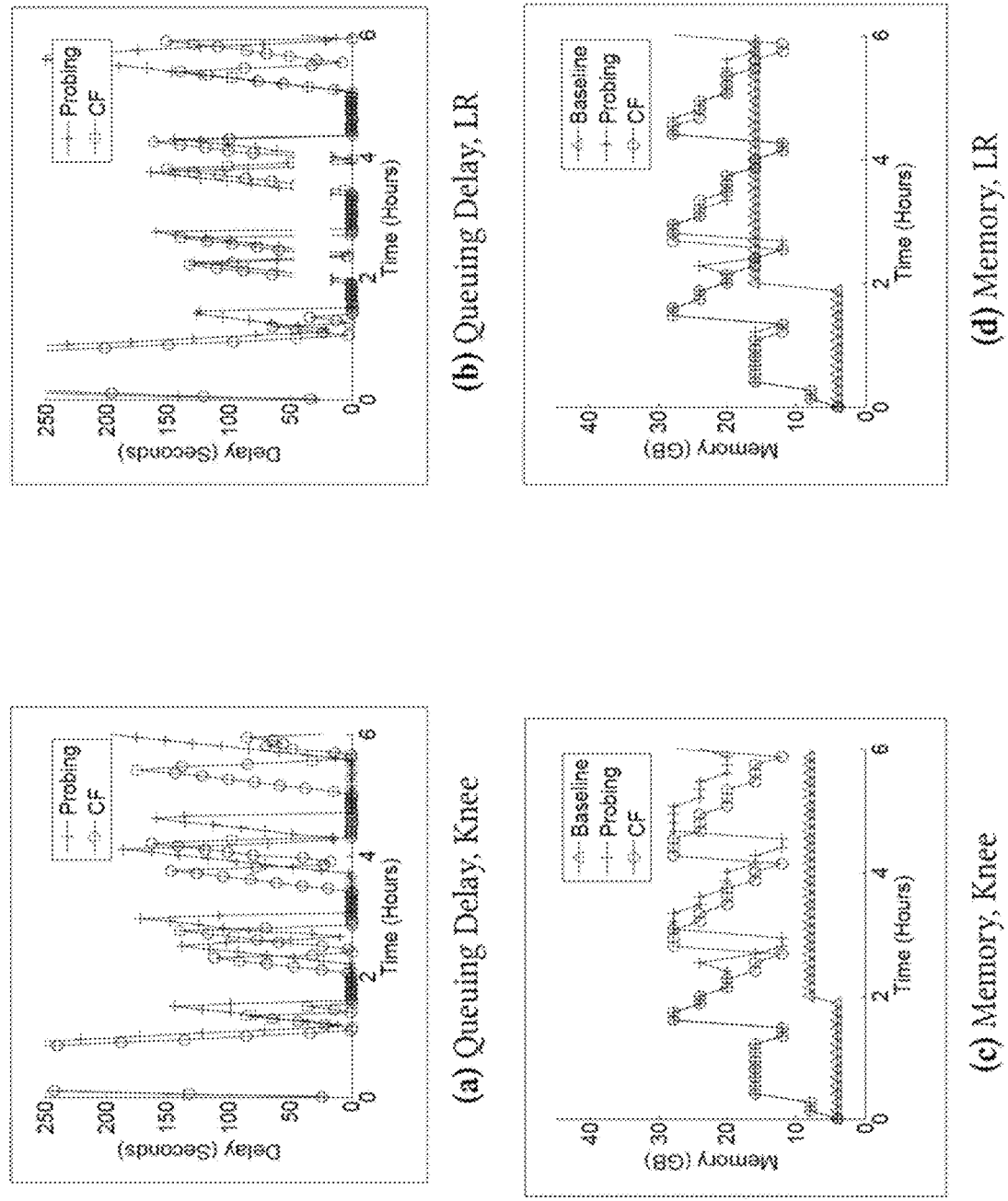
FIGS. 8A and 8B illustrate different plots showing the effects of allocating resources in accordance with the disclosed principles.

This improvement is evident in the memory graphs in plots C and D of FIG. 8A. The probing and CF plots diverge as time progresses because of the faster effective launch time of the CFs. This is also the source of the lower queuing delay. The charts in FIG. 8A show that the LR is a very good estimate of the required memory since probing oscillates about this value. Throughput charts (e.g., plots E and F in FIG. 8B) are also similar between the thresholds because probing takes precedence over MRCs in this evaluation. The throughput follows VM and CF allocation with some variation as VMs and CFs launch.

Figure 8B:
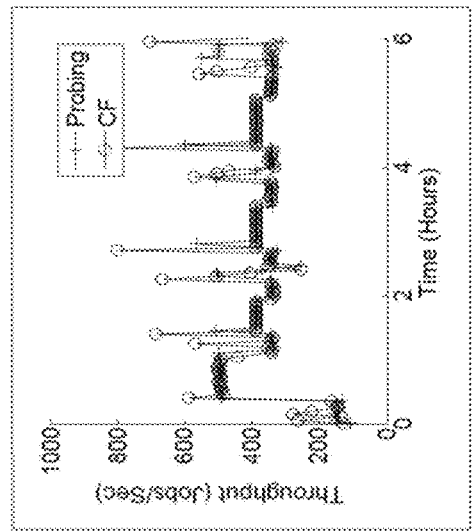
Figure 8B:
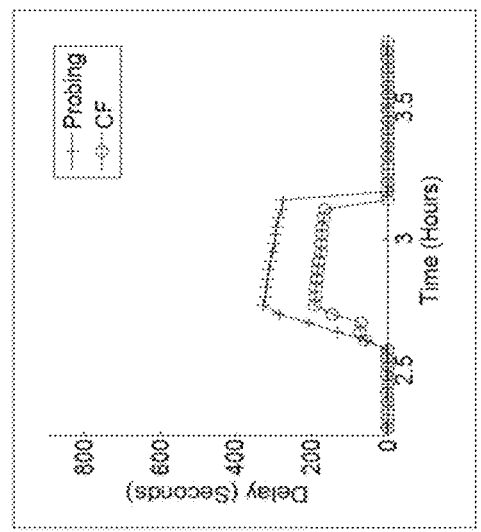
Figure 8B:
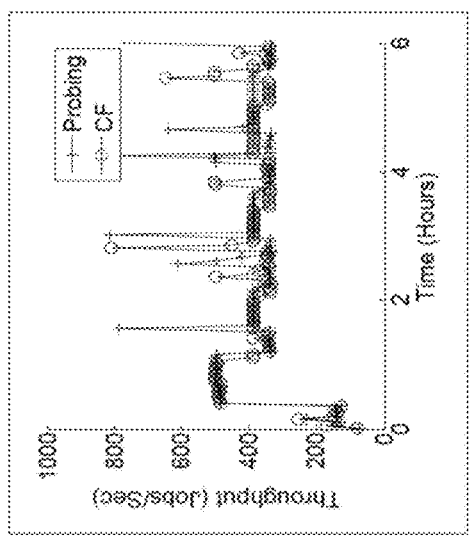
Figure 8B:
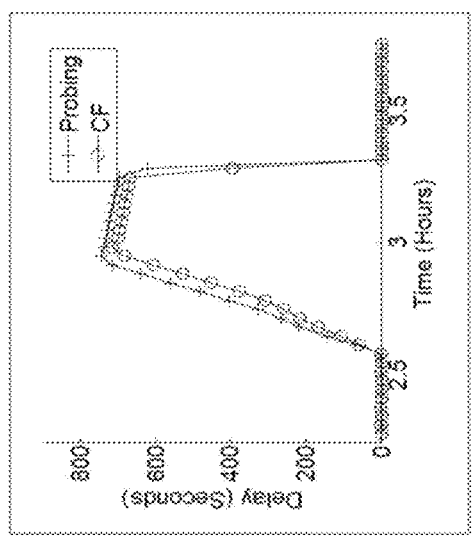

To observe MRC behavior when it takes precedence over probing, it is beneficial to run a second caching experiment. A step function is created of request rate in which the first 2.5 hours run at 100 req/sec, the next 30 min at 500 req/sec, and produce no messages thereafter. Running at a low request rate for a long period of time allows the system to compute about the same MRC as in the first experiment while keeping the queue empty, avoiding a probing event. The scale out event at the step uses the MRC threshold. Plots G and H of FIG. 8B show the queuing delay. In some cases, it is beneficial to omit memory and throughput charts as they follow the step function. Table 6 showed the mean results over the time from 2.5 to 3.5 hours. LR improves queuing delay by 2.5× without CFs and 4× with CFs compared to the knee. CFs improve queuing delay by 1.8× over VMs alone.

Batch Application

Figure 9:
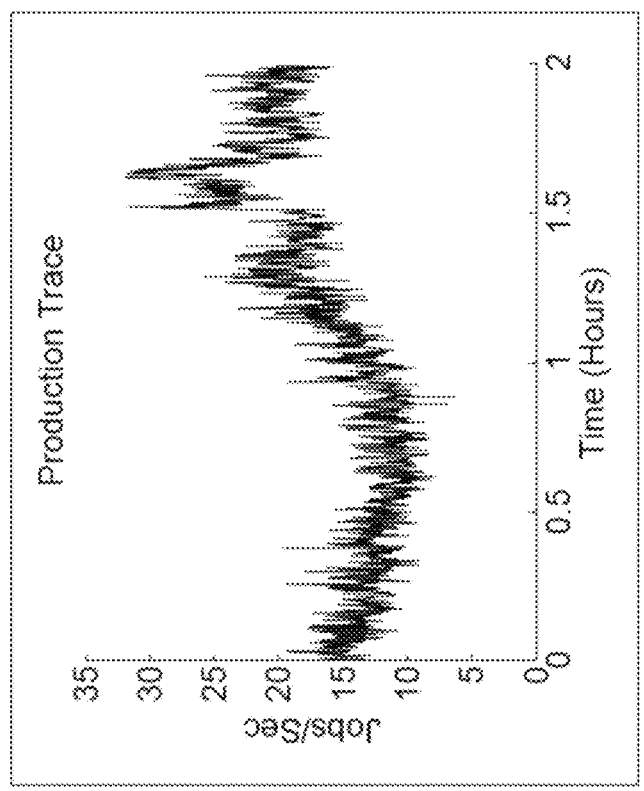
FIG. 9 illustrates an example production trace.
Figure 10:
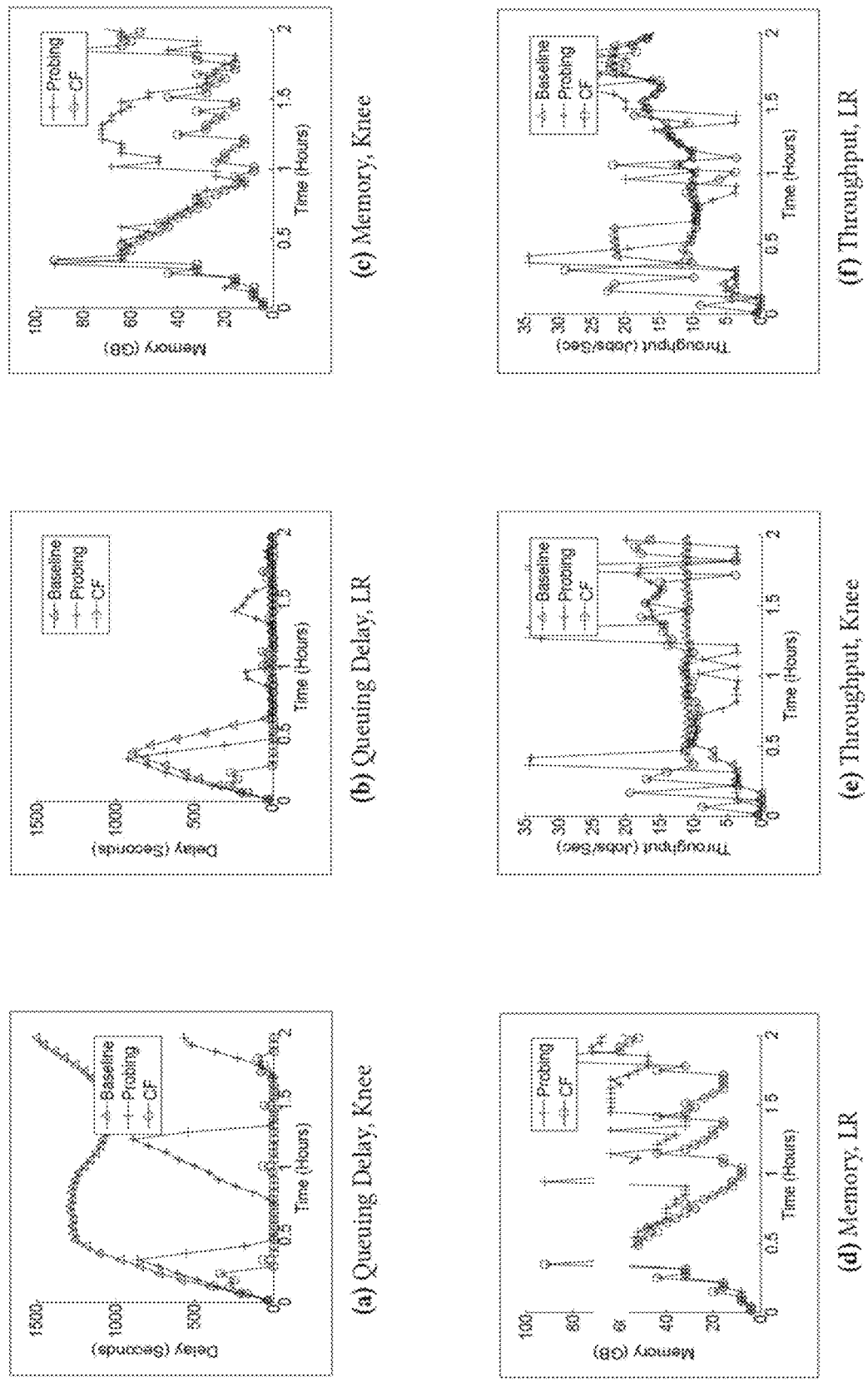
FIG. 10 illustrates some additional plots showing the effects of allocating resources.

In some cases, it is beneficial to evaluate the batch application on the trace shown by production trace 900 in FIG. 9 taken from a production system. The production trace 900 has a sudden increase in traffic near the 1.5 hour mark. Table 7 showed the mean values across the entire duration. FIG. 10 shows different plots (e.g., plot A, B, C, D, E, and F) for each metric. Each experiment begins with minimal resources. Additionally, it takes time to collect memory references to compute an MRC. MRCs can be computed every 15 minutes in this experiment. The first spike in the figures is caused by probing without the benefit of MRC since it has not yet been computed. The benefit of LR and CFs techniques is in collapsing the spikes in queuing delay.

The baseline evaluation using the knee threshold is not able to control queuing delay as shown in plot A in FIG. 10 and it tends toward infinity as the offered workload increases. Using the LR threshold does control queuing delay as shown in plot B in FIG. 10. The evaluations with probing show a TCP-like sawtooth pattern in the queuing delay. With little allocated memory, the queuing delay increases. The probing algorithm reacts by allocating more resources as shown in plots C and D in FIG. 10 until the queuing delay begins to decrease.

When the queuing delay has reached zero, the probing algorithm decreases resources until the delay begins to increase again and the process repeats. After initial probing, the baseline computes a constant memory requirement (16 GB for the knee and 28 GB for the LR) and it is possible to omit it from the memory charts for clarity. There is an increase in resources at the 1-hour mark. Without CFs, the LR computes a higher memory requirement (about 60 GB) compared to the knee (about 48 GB) at this point. This results in the LR preventing the queuing delay from growing as quickly and a much smaller spike in the queuing delay is observed compared to the knee.

Plots E and F in FIG. 10 show throughput. The baseline throughput for the knee is constant because it is under provisioned and cannot control queuing delay. The baseline for LR follows the offered load closely because it is sufficiently provisioned for the load.

In the baseline, throughput with LR is about 1.5× faster than the knee. With probing, it reduces queuing delay by ½. It also shows a 15% decrease in page faults/core. Adding probing improves the knee results significantly and allows it to control queuing delay. On average, it computes about the same amount of memory as LR which shows that even with a threshold that is too low, probing for memory allows the system to perform well. With the decrease in effective launch time, adding CFs nearly equalizes the performance of the different thresholds; however, some tests still see about a 14% decrease in queuing delay with LR.

Accordingly, sizing an application's memory correctly is critical to its performance. The disclosed embodiments create a new approach to application scaling that does not require specification of any thresholds. Indeed, the MMU emulator of the QEMU hypervisor can be modified to capture memory references from a running VM to generate the miss ratio curve (MRC) of an application. The embodiments modeled the MRC as a hyperbola to allow selection of a natural threshold (operating point) on the curve. The latus rectum of the hyperbola is chosen as the natural threshold. The threshold is used to determine a starting point to find an appropriate amount of memory for the system. A probing algorithm is developed to fine-tune the allocated system memory. The method is evaluated for two classes of applications, batch processors and web server caches. The LR threshold showed a speedup in throughput of 1.5×. With probing, it reduced queuing delay by ½ versus the knee in the evaluation.

Example Method(s)

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 11:
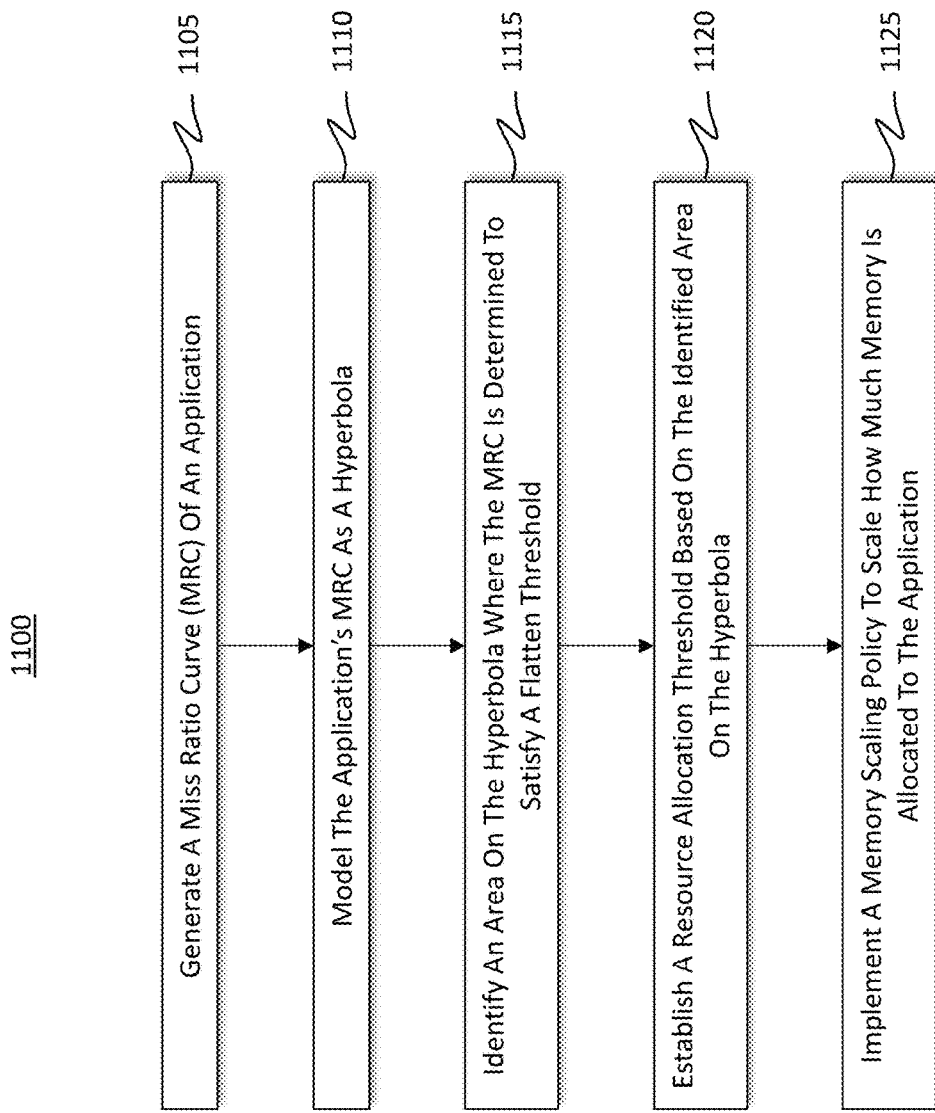
FIG. 11 illustrates a flowchart of an example method for allocating resources to an application.

FIG. 11 shows a flowchart of an example method 1100 for automatically scaling how much memory and/or resources are allocated to an application. By doing so, the embodiments are able to reactively scale resources for memory-intensive applications and are able to automatically adapt to workload changes having no pre-specified thresholds.

Initially, method 1100 includes an act 1105 of generating a miss ratio curve (MRC) of an application based on application runtime statistics (e.g., miss ratio data) that are extracted from or otherwise associated with the application. For instance, an MRC generally plots a relationship between the number of cache misses/page faults relative to the total number of memory references or memory size. To make these initial determinations, some embodiments utilize a lightweight application programming tool to initially gauge or measure out the application's compute usage, memory usage, and page faults. That is, the tool can be used to generate an initial memory usage profile of the application, where the profile details how the application behaves, including information describing the application's memory usage and page faulting. In some embodiments, profiling the application is performed by collecting memory traces using a modified hypervisor during a runtime of the application. For instance, the embodiments may continuously sample (e.g., for a predetermined period of time) a number of memory accesses to extract the MRC.

Subsequently, method 1100 includes an act 1110 of modeling the application's MRC as a hyperbola. For instance, a curve fitting function may be used to plot the hyperbola based on the memory data included in the application's profile (i.e. the miss ratio data that was previously extracted). As described in the figures, the modeled hyperbola will typically include a long tail portion.

Once this hyperbola is modeled, then method 1100 includes an act 1115 of identifying an area on the hyperbola where the MRC is determined to satisfy a flatten threshold (e.g., at the intersection of the application's MRC with its latus rectum). In this regard, the disclosed embodiments model an application's MRC as a hyperbola and identify an intersection of that hyperbola and its latus rectum as a natural threshold that is well-suited to applications where cache misses/page faults are costly. In accordance with the disclosed principles, the embodiments structure memory scaling policies to provision memory in a manner so as to satisfy a new threshold defined by the flattened region of the curve. By maintaining memory availability at this new threshold, the embodiments are able to reduce miss rate while improving performance. Regarding memory availability, it is generally meant that VMs and/or CFs are provisioned or otherwise allocated to service the needs of the current workload.

Method 1100 then includes an act (act 1120) of establishing a resource allocation threshold based on the identified area on the hyperbola. This resource allocation threshold indicates how many resources are to be provisioned for the application.

Thereafter, method 1100 includes an act 1125 of scaling the resources that are to be provisioned for the application using a resource scaling policy that is based on the resource allocation threshold. That is, the memory or resource scaling policy scales how much memory or other types of resources are allocated to the application.

By way of example, any number of VMs may be dynamically started or stopped in order to scale to the needs of the application. As described earlier, some embodiments beneficially use cloud functions (CFs) as interim resources until a new VM becomes ready. Because a CF is able to start faster than a VM, the CF acts as an intermediary device or buffer in order to handle the fluctuating workload needs. That is, when used for short durations, CFs provide additional computing power and memory, which is useful while VMs continue to launch. In this regard, the so-called memory or resource scaling policy refers to the dynamic allocation of both VMs and CFs, as described throughout this disclosure.

Accordingly, the embodiments disclosed herein provide for an adaptive and dynamic technique for autoscaling memory to meet the demands of a fluctuating workload. The embodiments are able to quickly and readily respond to changing conditions and help keep applications running efficiently.

Example Computer System(s)

Figure 12:
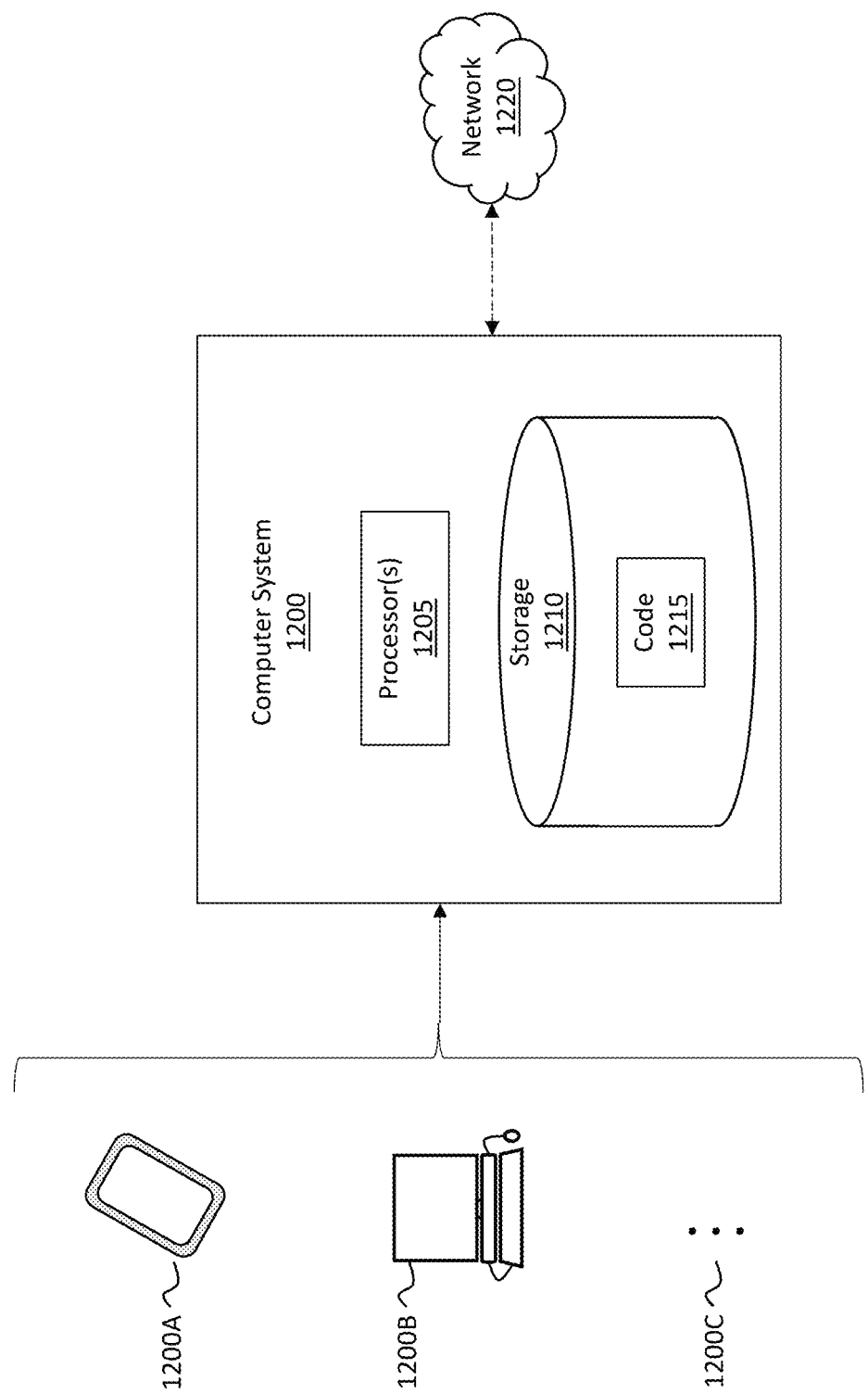
FIG. 12 illustrates an example computing system capable of performing the disclosed operations.

Attention will now be directed to FIG. 12 which illustrates an example computer system 1200 that may be used to facilitate the operations described herein. Computer system 1200 may take various different forms. For example, in FIG. 12, computer system 1200 may be embodied as a tablet 1200A, a desktop 1200B, or any other form. The ellipsis 1200C demonstrates that computer system 1200 may be embodied in any form. Computer system 1200 may also be a distributed system that includes one or more connected computing components/devices that are in communication with computer system 1200, a laptop computer, a mobile phone, a server, a data center, a cloud cluster of computer, and/or any other computer system.

In its most basic configuration, computer system 1200 includes various different components. FIG. 12 shows that computer system 1200 includes at least one processor 1205 (aka a "hardware processing unit") and storage 1210.

Storage 1210 is shown as including executable code/instructions 1215. The executable code/instruction 1215 represent instructions that are executable by the computer system to perform the disclosed operations, such as those described in method 1100 of FIG. 11.

Storage 1210 may be physical system memory, which may be volatile, non-volatile, or some combination of the two. The term "memory" may also be used herein to refer to non-volatile mass storage such as physical storage media. If computer system 1200 is distributed, the processing, memory, and/or storage capability may be distributed as well. As used herein, the term "executable module," "executable component," or even "component" can refer to software objects, routines, or methods that may be executed on computer system 1200. The different components, modules, engines, and services described herein may be implemented as objects or processors that execute on computer system 1200 (e.g. as separate threads).

The disclosed embodiments may comprise or utilize a special-purpose or general-purpose computer including computer hardware, such as, for example, one or more processors (such as processor 1205) and system memory (such as storage 1210), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are physical computer storage media. Computer-readable media that carry computer-executable instructions are transmission media. Thus, by way of example and not limitation, the current embodiments can comprise at least two distinctly different kinds of computer-readable media: computer storage media and transmission media.

Computer storage media are hardware storage devices, such as RANI, ROM, EEPROM, CD-ROM, solid state drives ("SSD") that are based on RANI, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1200 may also be connected (via a wired or wireless connection) to external sensors (e.g., one or more remote cameras, accelerometers, gyroscopes, acoustic sensors, magnetometers, etc.). Further, computer system 1200 may also be connected through one or more wired or wireless networks 1220 to remote/separate computer systems(s) that are configured to perform any of the processing described with regard to computer system 1200.

A "network," like the network 1220 shown in FIG. 12, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1200 will include one or more communication channels that are used to communicate with the network 1220. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RANI and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

Additionally, or alternatively, the functionality described herein can be performed, at least in part, by one or more hardware logic components (e.g., the processor 1205). For example, and without limitation, illustrative types of hardware logic components that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), and other types of programmable hardware.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system that reactively scales resources for memory-intensive applications and that automatically adapts to workload changes having no pre-specified thresholds, said computer system comprising:
   one or more processors; and
   one or more computer-readable hardware storage devices having stored thereon computer-executable instructions that are executable by the one or more processors to cause the computer system to at least:
      generate a miss ratio curve (MRC) of an application based on application runtime statistics that are extracted from the application;
      model the application's MRC as a hyperbola;
      identify an area on the hyperbola where the MRC is determined to satisfy a flatten threshold;
      establish a resource allocation threshold based on the identified area on the hyperbola, the resource allocation threshold indicating how many resources are to be provisioned for the application; and
      scale the resources that are to be provisioned for the application using a resource scaling policy that is based on the resource allocation threshold, wherein using the resource scaling policy includes (i) launching a newly provisioned virtual machine (VM) to satisfy a memory requirement of the application and (ii) while the VM is being launched, using a cloud function (CF) as an interim resource to satisfy the memory requirement of the application until such time as the VM becomes ready,
      wherein the CF is a lightweight computing element available in a cloud platform, and
      wherein the CF is short lived and refrains from maintaining state when decommissioned.

2. The computer system of claim 1, wherein generating the MRC of the application is performed during runtime of the application and is performed by capturing memory references from a memory slice of the application while the application executes.

3. The computer system of claim 2, wherein capturing the memory references from the memory slice is performed using a virtual machine (VM).

4. The computer system of claim 1, wherein scaling how much memory is allocated to the application is performed by refraining from requiring prior knowledge of an expected workload of the application.

5. The computer system of claim 1, wherein the application runtime statistics are extracted using a hypervisor, which collects memory traces.

6. The computer system of claim 1, wherein the memory allocation threshold determines a memory size that avoids thrashing and storage-bound performance.

7. The computer system of claim 1, wherein the resources include a virtual machine (VM).

8. The computer system of claim 1, wherein scaling the resources that are to be provisioned for the application includes temporarily using a cloud function (CF) to temporarily absorb an increase in a workload of the application during an intervening time period in which a virtual machine (VM), which has been tasked with providing additional resources to the application, is coming online.

9. A method for reactively scaling resources for memory-intensive applications and for automatically adapting to workload changes with no pre-specified thresholds, said method comprising:
   generating a miss ratio curve (MRC) of an application based on application runtime statistics that are extracted from the application;
   modeling the application's MRC as a hyperbola;
   identifying an area on the hyperbola where the MRC is determined to satisfy a flatten threshold;
   establishing a resource allocation threshold based on the identified area on the hyperbola, the resource allocation threshold indicating how many resources are to be provisioned for the application; and
   scaling the resources that are to be provisioned for the application using a resource scaling policy that is based on the resource allocation threshold, wherein scaling the resources that are to be provisioned for the application includes:
      determining a new virtual machine (VM) is to be launched to increase total system memory in response to an increased workload of the application;
      initiating launch of the VM; and
      launching a determined number of cloud functions (CF) to temporarily absorb the increased workload while the VM is being launched,
      wherein the number of CFs that are launched provide an aggregate amount of memory equal to the VM,
      wherein requests are routed to the CFs to begin immediate processing while the VM is being launched, and
      wherein, when the VM is online, the CFs are terminated and new requests are shifted to the VM.

10. The method of claim 9, wherein an application programming interface (API) is provided to communicate with the CFs, and wherein parameters of requests to the CFs are formatted in accordance with the API.

11. The method of claim 9, wherein the resource scaling policy, when implemented, causes an initial pool of cloud functions (CFs) to be initiated, and wherein the CFs in the pool are in a suspended state until such time as an increased memory requirement of the application is detected.

12. The method of claim 11, wherein each CF in the pool is initially loaded with a corresponding instance of the application.

13. The method of claim 9, wherein the MRC changes over time as patterns in a workload of the application change.

14. The method of claim 13, wherein the MRC is recomputed periodically, and wherein the MRC is generated based on a sampling of a subset of spatially hashed memory references.

15. A method for reactively scaling resources for memory-intensive applications and for automatically adapting to workload changes with no pre-specified thresholds, said method comprising:
   generating a miss ratio curve (MRC) of an application based on application runtime statistics that are extracted from the application;
   modeling the application's MRC as a hyperbola;
   identifying an area on the hyperbola where the MRC is determined to satisfy a flatten threshold;
   establishing a resource allocation threshold based on the identified area on the hyperbola, the resource allocation threshold indicating how many resources are to be provisioned for the application; and scaling the resources that are to be provisioned for the application using a resource scaling policy that is based on the resource allocation threshold, wherein the resource scaling policy, when implemented, causes an initial pool of cloud functions (CFs) to be initiated, and wherein the CFs in the pool are in a suspended state until such time as an increased memory requirement of the application is detected.

16. The method of claim 15, wherein runtime measurements are used to estimate an average amount of memory a request of the application requires.

* * * * *